United States Patent [19]

Uchiyama et al.

[11] 4,187,019
[45] * Feb. 5, 1980

[54] FLASH LIGHT PHOTOGRAPHIC SYSTEMS

[75] Inventors: Takashi Uchiyama, Yokohama; Zenzo Nakamura, Urawa; Tokuichi Tsunekawa, Yokohama; Masanori Uchidoi, Yokohama; Yukio Mashimo, Tokyo; Shyohei Ohtaki, Machida, all of Japan

[73] Assignee: Canon Kabushiki Kaisha, Tokyo, Japan

[ * ] Notice: The portion of the term of this patent subsequent to Mar. 7, 1995, has been disclaimed.

[21] Appl. No.: 824,102

[22] Filed: Aug. 12, 1977

Related U.S. Application Data

[63] Continuation of Ser. No. 625,711, Oct. 24, 1975, Pat. No. 4,078,242.

[30] Foreign Application Priority Data

Oct. 29, 1974 [JP] Japan .................................. 49-124612
Oct. 30, 1974 [JP] Japan .................................. 49-125110

[51] Int. Cl.² ............................................. G03B 7/16
[52] U.S. Cl. .................................... 354/33; 354/60 F; 354/139; 354/145; 354/149
[58] Field of Search ............... 354/33, 60 F, 145, 139, 354/149

[56] References Cited

U.S. PATENT DOCUMENTS

| | | | |
|---|---|---|---|
| 3,688,664 | 9/1972 | Mashimo | 354/33 |
| 3,710,701 | 1/1973 | Takishima et al. | 354/149 |
| 3,742,828 | 7/1973 | Nakajima et al. | 354/33 |
| 3,757,654 | 9/1973 | Mori | 354/33 |
| 3,836,920 | 9/1974 | Uchiyama et al. | 354/149 |
| 3,886,568 | 5/1975 | Yazaki et al. | 354/139 |
| 3,995,286 | 11/1970 | Tokutomi | 354/33 |
| 4,047,194 | 9/1977 | Nakamura et al. | 354/149 |
| 4,078,242 | 3/1978 | Uchiyama et al. | 354/139 |

FOREIGN PATENT DOCUMENTS

49-15430  2/1974  Japan.

Primary Examiner—Russell E. Adams
Attorney, Agent, or Firm—Toren, McGeady and Stanger

[57] ABSTRACT

The present invention relates to various kinds of the flash light photographic systems consisting of a combination of either of the below mentioned cameras with either of the below mentioned flash light device;

a camera CD presenting an input terminal of the information for controlling the diaphragm and the output terminal of the information for the set aperture, a flash light device SD presenting the output terminal of the information for controlling the diaphragm and the input terminal of the information of the set aperture, a camera CT presenting an input terminal of the information for controlling the diaphragm, a camera CA presenting an output terminal of the information of the set aperture, a flash light device ST presenting an output terminal of the information for controlling the diaphragm, a flash light device AS presenting an input terminal of the information of the set aperture.

22 Claims, 21 Drawing Figures

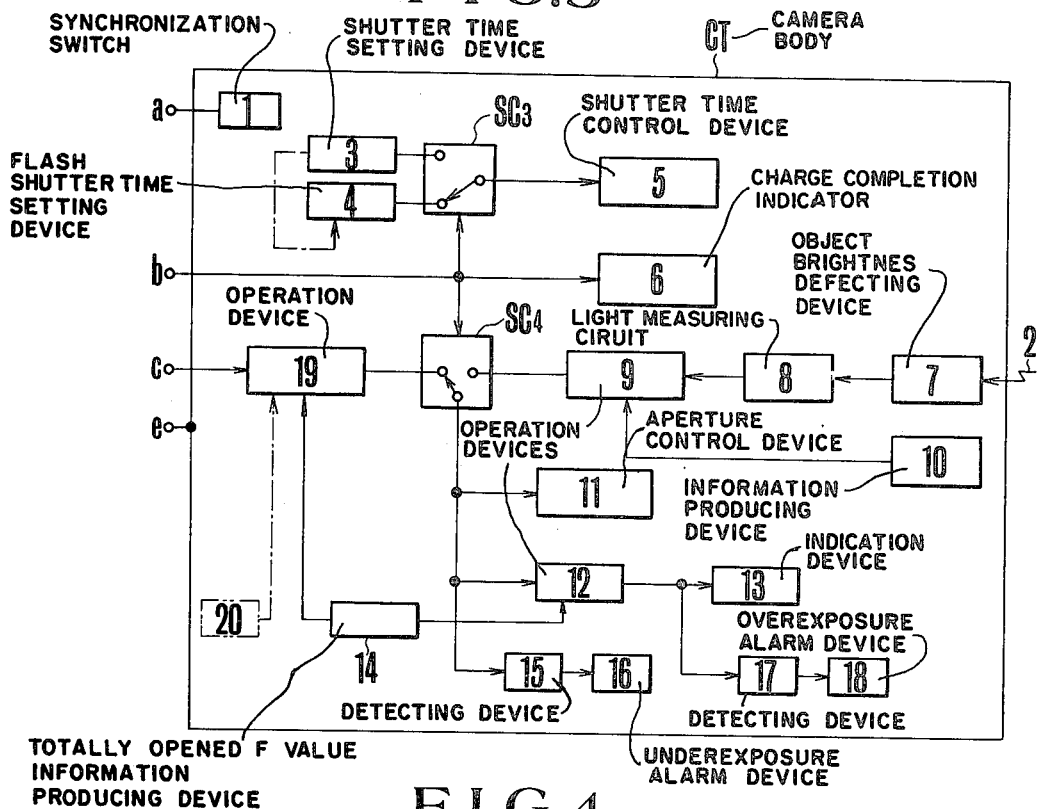
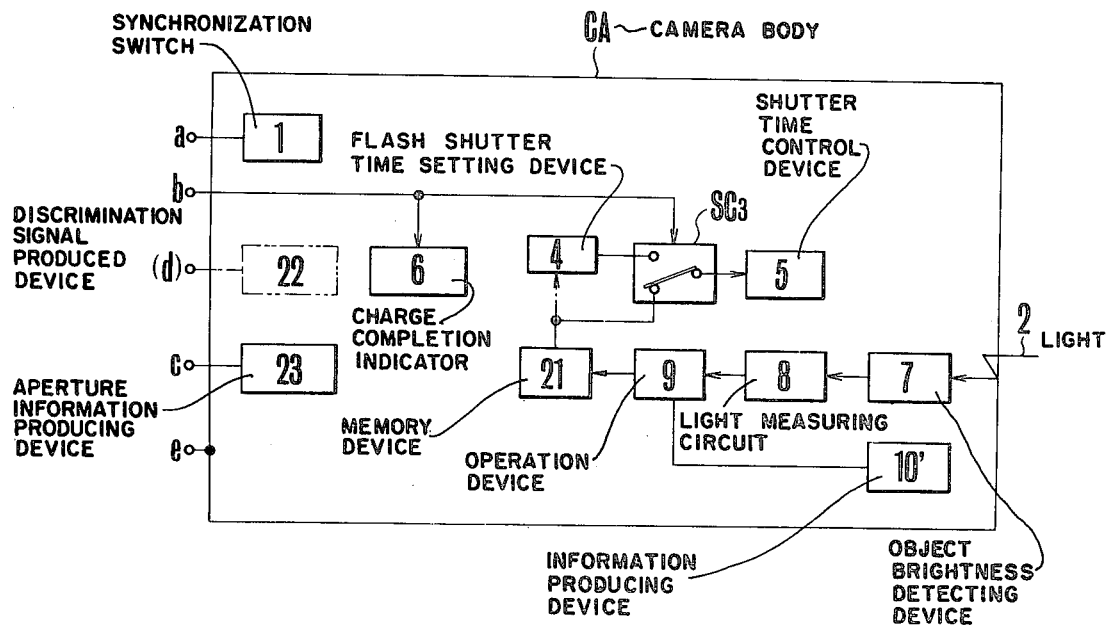

4,187,019

FLASH LIGHT PHOTOGRAPHIC SYSTEMS

This is a continuation of Application Ser. No. 625,711 filed Oct. 24, 1975, now U.S. Pat. No. 4,078,242.

BACKGROUND OF THE INVENTION

1. Field of the Invention

The present invention relates to a flash units and cameras for taking flash photograph.

2. Description of the Prior Art

In one known flash system, a flash unit generates a signal, corresponding to a desired aperture value, at a data output terminal. A camera, which receives the signal at a data input terminal, displays the signal in the camera view finder or utilizes the signal to adjust the aperture. In a second known system, a camera responds to a preset aperture value and a desired flash brightness signal at a data output terminal. A flash unit receives the signal at a data input terminal and sets the flash brightness to a proper value.

SUMMARY OF THE INVENTION

An object of the present invention is to render either of such cameras capable of performing the functions of both by adding only a few parts, in a convenient and economic manner.

Another purpose of the present invention is to make either flash units capable of performing the operation of both by adding only a few parts to the first or the second flash unit.

A another purpose of the present invention is to permit automatic change switching of the operating mode of the flash unit to that of the camera, a reduction of the number of data the input and output terminals, an indication in the view finder as to whether the flash light device is ready for operation, prevention of misoperation, switching of the shutter time into that for the flash light photography, etc.

BRIEF DESCRIPTION OF THE DRAWINGS

FIG. 3 shows a circuit diagram of an embodiment of the camera with priority on shutter time, being used in functional engagement with the corresponding flash unit device.

FIG. 4 shows a circuit diagram of an embodiment of the camera with priority on aperture value, being used in functional engagement with the corresponding flash light device.

DESCRIPTION OF PREFERRED EMBODIMENT

Below the present invention is explained in detail in accordance with the accompanying drawings.

Figure 1:
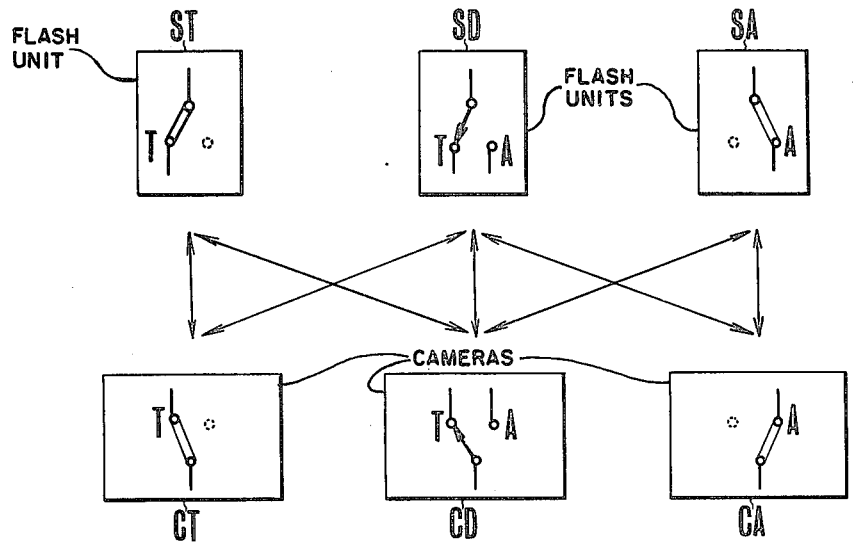
FIG. 1 shows the relations between the camera in accordance with the present invention and the flash light device.

FIG. 1 shows the flash light device and the camera for various kinds of the flash light photography, whereby ST and CT respectively are the flash light device and the camera for the above mentioned first flash light photography, while SA and CA respectively are the flash light device and the camera for the above mentioned second flash light photography. SD is the flash light device in accordance with the present invention, presenting the information input terminal and the output terminal, whereby the flash light device present the function of the above mentioned ST and that of the above mentioned SA in such a manner that by means of the manual or the automatic changing over either of the above functions is carried out. In consequence the flash light device SD is capable of not only the first flash light photography with the above mentioned camera CT but also the second flash light photography with the above mentioned camera CA. Further the flash light device SD is capable of not only the first flash light photography but also the second flash light photography with the below mentioned camera CD of the present invention in accordance with the set conditions. CD is the camera presenting the function of the above mentioned CT as well as that of the above mentioned CA in such a manner that by means of the manual or the automatic changing over either of the function is carried out. In consequence, the camera CD is capable of the first flash light photography with the above mentioned flash light device ST or of the second flash light photography with the above mentioned flash light device SA. Further, the camera CD is capable of both the first flash light photography and the second flash light photography with the above mentioned flash light device SD.

Figure 2:
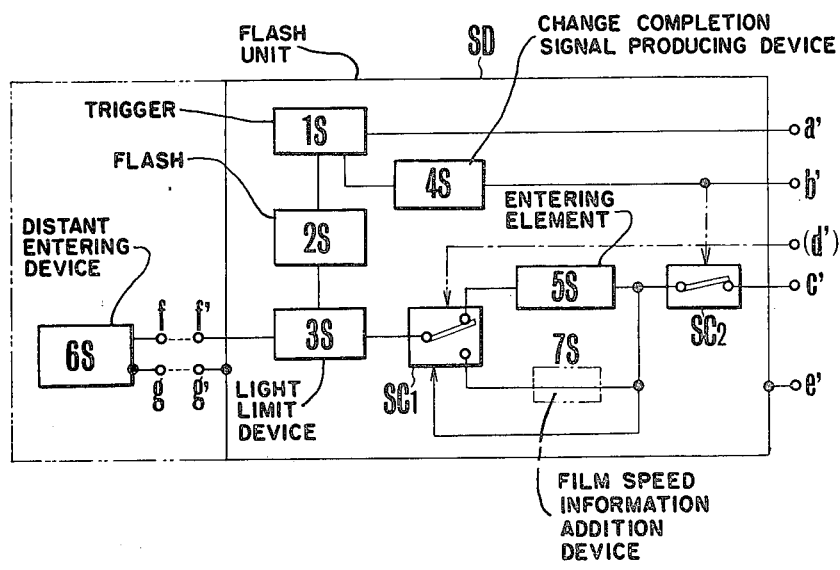
FIG. 2 shows a circuit block diagram of an embodiment of the flash light device in accordance with the present invention.

FIG. 2 shows a circuit diagram of an embodiment of the above mentioned flash light device SD. In the drawing, SD is the above mentioned flash light device, whose terminals a', b', c', d' and e' are respectively connected to the corresponding terminals a, b, c, d and e of the above mentioned camera, CT, CA, CD to be explained later in detail by means of the cords or the terminals provided on the accessary shoe. In case a part of the components to be provided in the flash light device is provided in a separate body as is shown in the drawing, the terminals f' and g' of the separate body are connected to the terminals f and g of the flash light device by means of the cords or the terminals provided on the mount. $SC_1$ is the changing over device by means of which the operation mode of the flash light device is changed over either for the first flash light photography or the second flash light photography by manually operating the change over operation member provided at the flash light device or automatically by the discrimination signal from the connected camera.

1S of the flash light device SD is the trigger device of the flash light discharge tube which is connected to the synchronization switch at the side of the camera through the terminal a', a in such a manner that by closing the synchronization switch a trigger signal is produced so as to actuate the flash light device 2S. 4S is the charge completion signal producing device of the main capaciter which device delivers a signal to the side of the camera through the terminal b' being synchronized for example, with the lightening up of the neon tube so as to set the above mentioned trigger device 7S ready for operation. 5S is the aperture value information producing device which produces an absolute aperture value signal corresponding to the set aperture value of the photographic lens, determined in accordance with the characteristics of the flash light device, the changed over state and so on in such a manner that the produced absolute aperture value signal is delivered to the operation device at the side of the camera by means of the terminals c', c through the change over device $SC_2$. Hereby in case it is so designed that the information of the film sensitivity is not put in the aperture determining device at the side of the camera, in functional engagement with the operation device at the time of taking a photograph under flash light, the film sensitivity is also set in 5S. 6S is the distance information producing device which is composed either as one body with the flash light device SD or as separated body as is shown in the drawing. 6S further includes a light sensing element for receiving the flash light reflected by the object to be photographed, whereby as soon as the integrated value reaches a certain determined value, the flash light amount limit device 3S is actuated so as to stop the illumination of the flash light device 2S. Hereby 6S can be composed as distance information producing device consisting of a resistance variable in functional engagement with the focusing operation of the photographic lens so as to control the illumination of the flash light device. Further the flash light amount limit device 3S is, beside the information from 6S, supplied with the information from the above mentioned aperture value information producing device 5S in accordance with the mode of the change over device $SC_1$ or the aperture value information from the side of the camera so as to control the flash light amount of the flash light device 2S. Hereby it is also possible to provide the change over device $SC_2$ as is shown in dotted line in the drawing in such a manner that the change over device $SC_2$ is controlled by the charge completion signal producing device of 4S so as to deliver the aperture value information to the side of the camera only after the completion of charging. In the drawing, e' and g' are the terminals for the common line between the flash light device SD on the one side and the camera and 6S on the other side. d' is the terminal through which the discrimination signal from the side of the camera enters, whereby the input signal differs whether the first or the second camera is connected in such a manner that the change over device $SC_1$ is automatically set to the desired mode. Hereby it is also possible to eliminate the terminal d', substituting it with the above mentioned terminal c' in such a manner that the change over device $SC_1$ is automatically set to the desired mode by means of the discrimination signal serving at the same time as aperture value information signal coming through the terminal c'. In case the flash light device SD is used with the second camera, the change over device $SC_1$ is set to the inversed mode shown in the drawing by means of the manual change over operation or the discrimination signal coming through the above mentioned d' or c' serving as d'. In this way, the aperture value information produced in the second camera is put in the flash light amount control device 3S through the terminal c', the change over device $SC_2$ closed at the charge completion and the change over device $SC_1$ in such a manner that the flash light output of the flash light device 2S is controlled by means of the input coming from the distance information producing device 6S. Hereby in case the aperture value information coming from the side of the camera does not include the film speed information it is necessary to provide the film speed information addition device 7S as is shown in dotted line in the drawing. Hereby the explanation has been made for the embodiment in which the flash light device SD is separated from 6S, whereby it is also possible to provide other components than 6S in the separate body with 6S. The circuit diagram for the above mentioned flash light device ST and SA are omitted, because it is identical with that shown in FIG. 2, whereby the change over device $SC_1$ of SD in FIG. 2 is fixed at the shown position and at the inversed position, eliminating 7S or 5S.

Below an embodiment of the first camera indicating or controlling the aperture value in response to the aperture value signal coming through the above mentioned flash light device SD or ST will be explained in accordance with FIG. 3. 1 in the camera body CT is the synchronization switch being closed synchronized with the shutter operation. The switch 1 can either be of the conventional mechanical contact member or be an electrical switch consisting of semiconductor switching element. 3 is the shutter time setting device consisting of for example, a resistance variable in functional engagement with the shutter dial, while 4 is the flash light shutter time setting device for operating the shutter with a shutter time suited for the flash light photography for example 1/60 sec. Hereby it is also possible to compose 4 as a setting device for producing the flash light shutter time in connection with the above mentioned 3 as is shown in dotted line. Namely, in case the set value of 3 is suited for the flash light photography, the shutter time control device 5 operates as it is set, while in case the value is not suited, the control device 5 operate for example with 1/60 sec. 5 is the shutter time control device for controlling the shutter time with the set value of 3 or 4 in accordance to the mode of the change over device $SC_3$. 6 is the charge completion indication means of the flash light device. Which means operates only when the flash light device has been ready for operation. 7 is the object brightness detecting device consisting of a photoelectrical converting element for TTL totally opened light measurement for sensing the light 2 coming from the object to be photographed through the photographic lens so as to produce the brightness information influenced by the totally opened aperture value F of the lens. 8 is the light measuring circuit presenting for example, a logarithmically compressing characteristic for producing the compressed output of the above mentioned information at the output terminal. 9 is the operation device supplied with the information from the information producing device 10 to be set in functional engagement with the shutter dial, the film sensitivity dial, the totally opened F value signal member and so on beside the information from 8. Hereby the information of the so called vignetting taking place at the time of the totally opened light measurement by a bright lens is set in 10 as aperture information. There informations are operated by 9 so as to produce at the output terminal the diaphragm step number signal, namely the signal of the number of the steps for closing the diaphragm of the photographic lens from the totally opened F value for obtaining the proper exposure. 11 is the aperture control device for controlling the aperture of the photographic lens in accordance with the diaphragm step number signal produced by means of the change over device $SC_4$. 12 and 13 are the operation device and the indication device composing the indication circuit for indicating the absolute aperture value information obtained from the signal from the totally opened F value information producing device 14 set in functional engagement with the totally opened F value information member of the photographic lens and the above mentioned diaphragm step number signal. 15 and 16 are the detecting device and the under exposure alarm device for composing the under exposure alarm circuit, whereby when the diaphragm step number signal put in 15 does not suffice 16 operates so as to alarm the under exposure even with the totally opened F value. 17 and 18 are the detecting device and the over exposure alarm device for composing the over exposure alarm circuit, whereby the absolute aperture value signal put in 17 is excessive 18 operates so as to alarm the over exposure even with the smallest aperture value of the lens. 19 is the operation device for operating the absolute aperture value put in from the flash light device through the terminals c' and c and the totally opened F value from 14 so as to produce the diaphragm step number signal. When the change over device $SC_4$ is set to the side of 19, all of 11 to 18 operate in accordance with the output signal from 19 in such a manner that the various above mentioned devices at the side of the camera CT are operated by the informations from the flash light device SD or ST. Further 20 shown in dotted line in the drawing is the film speed information device which is necessary to be provided in case no film speed information is included in the signal sent from the flash light device to 19.

Below the operation in case the camera CT shown in FIG. 3 is connected to the above mentioned flash light device SD or ST is explained.

In case the flash light device is not mounted on the camera CT or the charge has not yet been completed even if the flash light device is mounted namely, at the time of taking a photograph under day-light, the charge completion signal is not sent to the camera CT from the flash light device so that the change over devices $SC_3$ and $SC_4$ are set to the sides opposite to those shown in the drawing. In consequence when the release is operated after the shutter time is set by means of 3, the shutter is operated with the desired time by means of 3 and 5, while the diaphragm control device 11 operates in accordance with the aperture value signal from 7 to 10, so as to control the diaphragm of the lens up to the aperture value suited for the proper exposure of the film. Hereby the indication device 13 indicates the above mentioned aperture value whereby when the aperture value is outside of the settable range of the diaphragm range of the photographic lens, either the under exposure alarm device 16 or the over exposure alarm device 18 operates so as to give alarm in advance. In this way, the photographer is able to change the setting of the shutter time so as to take a photograph within the settable range of the diaphragm. When the charge has not yet been completed even if the flash light device is mounted, 1S is out of the operation by means of 4S so that there is no danger that the flash light device should operate.

In case the flash light device is mounted on the camera CT and ready for operation, by means of the signal from the charge completion signal producing device 4S at the side of the flash light device the charge completion indication device 6 provided in the view finder operates so as to tell the photographer that the flash light device is ready for operation. Further the change over devices $SC_3$ and $SC_4$ are set at the sides shown in the drawing, while the shutter time is set by means of the flash light shutter time setting device 4 for example at 1/60 sec., which is connected with the shutter time control device 5 through $SC_3$ in such a manner that the shutter operates with the time suited for the flash light photography. On the other hand, the diaphragm control device 11, the aperture value indicating device 13 and the alarm devices 16, 18 operate all in accordance with the output signal of the aperture information producing device 5S in the flash light device so as to carry out the diaphragm control suited for the flash light photography, the indication as well as the alarming. By means of the synchronization switch 1 operating in synchronization with the release operation for releasing the shutter with the time suited for the flash light photography the flash light device is triggered whereby the flash light amount is controlled in accordance with the distance from the object and so on while the diaphragm at the side of the camera is set at a certain determined value as mentioned above, so that a proper exposure can be obtained for the flash light photography. Hereby when the flash light device operates the charge completion signal from 4S discontinues, so that regardless of the flash light amount the above mentioned indication device 6 remains out of operation more than the determined time so as to tell the photographer in the view finder that the flash light device has operated. In case the above mentioned flash light device is used in combination with the camera shown in FIG. 3 as mentioned above, the indication of the charge completion and the operation of the flash light device in the finder, the automatic change over of the circuit, the movement of the diaphragm as well as the automatic change over of the shutter time are carried out in the similar way as in case of ordinary EE photography, which is very convenient.

Below an embodiment of the second camera delivering an aperture signal to the above mentioned flash light device SA or SD, so as to control the flash light amount of the flash light device in accordance with the aperture value set at the side of the camera will be explained below. The same devices in the second camera CA as those in the above mentioned camera CT present the same numerical figures. Namely, 1, 2 and 4 to 9 in FIG. 4 are same as in FIG. 3. 10' is the information producing device which produces the total information of the film speed, the compensation of vignetting, the preset diaphragm step number and so on while the above mentioned 10 produces the total information of the film sensitivity, the shutter time, compensation of vignetting and so on. Hereby the preset diaphragm step number means the number of steps for presetting closing the diaphragm from the totally opened F value of the interchangeable lens mounted. 21 is the memory device for storing the signal of a certain determined time coming from the operation device in accordance with the brightness of the object to be photographed, while the shutter time control device 5 is supplied with the signal either from the flash light shutter time setting device 4 or from 21 whether the charge completion signal from the flash light device exists or not so as to operate the shutter accordingly. 22 is the discrimination signal producing device for delivering the discrimination signal to the change over device $SC_1$ of the above mentioned flash light device SD through the terminal so as to operate the change over device $SC_1$ in such a manner that the flash light device SD is functionally engaged with the camera CA. In case the terminal d' at the side of the flash light device serves at the same time as the terminal c', it must be so designed that the terminal d at the side of the camera CA should serve at the same time as the terminal c. 23 is the aperture information producing device for delivering the absolute aperture value information of the preset diaphragm from the side of the camera to the side of the flash light device through the terminal c, c'. In case 23 includes the film speed information, it is not necessary that the film speed information addition device 78 should be provided at the side of the flash light device SD as mentioned above.

Below the operation in case the above mentioned flash light device is connected to the camera CA shown in FIG. 4 will be explained. When the flash light device SD or SA is mounted on the camera CA or the charge has not yet been completed even if the flash light device SD or SA is mounted on the camera CA namely at the time of taking a photograph under day-light, no charge completion signal is delivered from the flash light device to the camera through the terminal b so that the charge completion indication device 6 provided in the view finder does not operate while the change over device $SC_3$ remains set at the position shown in the drawing. In consequence by means of 21 for storing the output of the memory device 9 supplied with the signal from the above mentioned 8 and 10' and the shutter time control device 5, the shutter operates with the desired time in accordance with the object brightness, the film speed and the preset aperture value so as to obtain the proper exposure under day-light. In case hereby the charge has not been completed even if the flash light device is mounted, 1S remains out of operation by means of the flash light device 4S so that the flash light device does not operate in the same way as in case of the camera CT in such a manner that a picture can be taken with the proper exposure under day-light.

In the case the flash light device is mounted on the camera CA and the flash light device is ready for operation, the charge completion indication device 6 provided in the view finder operates so as to tell the photographer that the flash light device is ready for operation. Hereby the change over device $SC_3$ is set at the position opposite to that shown in the drawing in such a manner that by means of the flash light shutter time setting device 4 connected to the shutter time control device 5 through $SC_3$ the shutter operates with a time for example 1/60 sec. suited for the flash light photography. Hereby it is possible to so design that usually the shutter time for the flash light photography is not constant as mentioned above but variable in accordance with the output of the operating device 9, while only when the output of the operating device 9 is not suited for the flash light photography, the shutter operates with the time suited for the flash light photography by means of the flash light shutter time setting device 4. The discrimination signal from the discrimination signal producing device 22 is delivered to the change over device $SC_1$ of the flash light device through the terminals d, d' or the substitutes c, c' so as to set the change over device $SC_1$ at the sides opposite to those shown in the drawing whereby in accordance with the information signal from the camera CA the flash light amount of the flash light device can be controlled. When the $SC_1$ is set as mentioned above and the change over device $SC_2$ is closed by the charge completion signal producing device 4S (Hereby $SC_2$ can be omitted as mentioned above), the aperture information producing device 23 at the side of the camera CA delivers the absolute aperture value information signal preset on the photographic lens as well as the film sensitivity information signal to the flash light amount control device 3S through the terminal c, c' and the change over devices $SC_2$, $SC_1$ (eventually the film speed information addition device 78). 3S is further supplied with the distance information from 6S so that after the diaphragm is closed down to the preset aperture value the shutter of the camera is released and the trigger device 1S actuates the flash light device 2S, whereby the flash light output of 2S is stopped by 3S as soon as the output reaches a certain determined value, so as to obtain the proper exposure for the flash light photography. After the operation of the flash light device the shutter is closed after the time suitable for the flash light photography as mentioned above. The photographer can recognize by the indication device 6 in the view finder that the flash light has operated in the same way as in case of the camera shown in FIG. 3.

Even in case the flash light device SA or SD is used in combination with the camera CA shown in FIG. 4, as mentioned above, in the same way as in case of the camera CT the charge completion indication and the flash light operation acknowledgement indication in the view finder, the automatic charge over of the circuit, the automatic change over of the shutter time suited for the flash light photography are carried out. As to the diaphragm movement the aperture value at the side of the camera CT is controlled in accordance with the flash light device for obtaining the proper exposure in case the camera CT is used while in case the camera CA is used, the flash light amount of the flash light device is adjusted in accordance with the aperture value at the side of the camera CA for obtaining the proper exposure.

As explained above by means of the flash light device in accordance with the present invention the flash light photography can be carried out as easily as in case of the usual auto-exposure photography, when used in combination with either camera, whereby when the flash light device is mounted but not yet ready for operation alarm is made, while the camera operates for the usual auto-exposure photography so as to obtain the proper exposure under day-light, which is very convenient.

Hereby the camera CA (FIG. 4) is taken up as an example of the auto-exposure camera with priority on aperture value, whereby the cam need not alway to be the auto-exposure camera, and it is also possible to compose the auto-exposure camera with priority on the shutter time being provided with the aperture information producing device for controlling the flash light device. Hereby the discrimination signal producing device is provided only on the camera CA but not on the camera CT so that the cameras CA and CT can easily be told from whereby it is possible that the discrimination signal producing device is provided on the camera CT and not on the camera CA and further it is possible to provide on both camera CA and CT the signal producing devices which produce different signals from each other.

Below an embodiment of the camera CD which can be functionally engaged with either of the above mentioned flash light device ST, SA or SD will be explained. The same devices in the embodiment as those of the above mentioned cameras CT and CA present the same numerical figures. 24 newly added in the drawing is the shutter time indication device in case the camera operates as the auto-exposure one with priority on aperture value, whereby the change over device $ATS_1$ to $ATS_6$ are all set to the A side in case of the priority on the aperture value while they are all set to the T side in case of the priority on shutter time. In case the change over devices $ATS_1$ to $ATS_2$ are set to the side T, the camera CD operates in the same way as the above mentioned camera CT (FIG. 3), while in case the change over devices are set to the side A the camera CD operates in the same way as the above mentioned camera CA (FIG. 4), whereby the camera CD is composed of the devices of both of the above mentioned cameras CT and CA. Below the composition of the camera CD will be explained together with the operation.

The case the change over devices $ATS_1$ to $ATS_6$ are set to the side T as is shown in the drawing while the flash light device is not mounted or the case the charge has not yet been completed even if the flash light device is mounted will be explained first. This is the case the auto-exposure photography is carried out with priority on shutter time under the day-light, whereby in the same way as in case of the camera shown in FIG. 3, the diaphragm step number signal for obtaining the proper exposure is produced by the operation device 9, and once stored in the memory device 21 through the change over device $SC_4$ in such a manner that the desired aperture value is adjusted by means of the control device 11 before the operation of the shutter of the camera. On the other hand, the above mentioned diaphragm step number signal is put in the indication device 13 through the change over device $ATS_5$ and the operation device 12 so as to indicate the desired aperture value for example in the view finder. Hereby instead of the circuit system shown in the dotted line and the change over device $ATS_5$ in the drawing, it is possible to so design that the output of the operation device 9 is put in the indication device 13 through the memory device 21 and the operation device 12 so as to indicate the aperture value. On the other hand, the change over device $ATS_4$ is set to the side T the output of the operation device 9 is not put in the shutter time indication device 24 so that the indication device 24 is out of operation. Further the output of the operation device 9 is not put in the shutter time control device so that the shutter operates in accordance with the shutter time setting device 3 set by means of the shutter dial.

Below the case that the camera is set in the mode with priority on the shutter time as is shown in the drawing (the change over devices $ATS_1$ to $ATS_5$ are all set to the side T) and the mounted flash light device has been charged will be explained. In this case also in the same way as in case of the camera CT shown in FIG. 3 the shutter operates for example, with 1/60 sec. by means of the flash light shutter time setting device 4 and the shutter control device 5. Further as to the diaphragm, the aperture value from the flash light device is once stored in 21 through the terminal c, the change over device $ATS_3$, 19 and $SC_4$ and the diaphram control device 11 operates accordingly in such a manner that the diaphragm is automatically set at the determined aperture value, which is indicated in the indication device 13. In this way, the shutter and the diaphragm are controlled so as to obtain the proper exposure even in case of the flash light photography.

Below the case that the camera CD is set in the mode with priority on aperture value (the change over devices $ATS_1$ to $ATS_5$ are all set at the side opposite to those shown in the drawing) will be explained. In this case the diaphragm is manually set with the preset ring by the photographer whereby the change over devices $ATS_4$ and $ATS_5$ are set at the side A, so that the diaphragm control device 11 and the indication device 13 are out of operation. Hereby no inconvenience takes place.

Below the operation of the shutter and others will be explained. In the same way, as in case of the camera CA shown in FIG. 4, the output of the operation device 9 supplied with the signal 8 and 10', namely the shutter time signal in accordance with the brightness of the object to be photographed is put in the memory device 21 through the change over device $SC_4$ normally set in the inversed mode shown in the drawing so as to be stored there. At the same time the shutter time signal is put in the shutter time indication device 24 through the change over device $ATS_4$ set to the side A in such a manner that the shutter time is indicated in the view finder of the camera. In case the flash light device is mounted and the charge has been completed the change over device $SC_3$ is set to the side shown in the drawing by means of the charge completion signal supplied through the terminal b so that in the same way as in case of the camera CA shown in FIG. 4 the shutter operates with the time suitable for the flash light photography by means of the flash light shutter time setting device 4 supplied with the time in accordance with the brightness of the object to be photographed from the memory device 21 and the shutter control device 5. Namely in case the output of the memory device 21 corresponds to the time within the range suitable for the flash light photography the shutter operates with the time in such a manner that the proper exposure of the principal object to be photographed is obtained with the flash light of the flash light device while generally the auxiliary object to be photographed more distant than the principal object to be photographed beyond the reach of the flash light is photographed with the proper exposure. In case the output of the memory device 21 is out of a certain determined range, for example a focal plane shutter is set at 1/250 sec., the shutter is controlled by 4 and 5 so as to operate with the time, for example 1/60 sec. capable of the flash light photography. In case on the contrary the output of the memory device 21 is too long time for the hand to hold the camera the shutter is controlled by 4 and 5 so as to operate for example with ¼ sec. The shutter of the camera CD operates as mentioned above at the time of taking a photograph under flash light, whereby the connected flash light device SD is changed over by means of the aperture information producing device 23 presenting at the same time the function of the discrimination signal producing device 22 through the change over device $ATS_3$ set to the side A and comes to response with the information from the aperture information producing device 23 in such a manner that the flash light output is controlled in accordance with the distance from the object to be photographed, the aperture information set at the side of the camera and so on so as to obtain the proper exposure. On the other hand, in case of the day-light photography, the shutter of the camera CD operates in the same way as in case of the above mentioned camera CA shown in FIG. 4, so as to obtain the proper exposure under day-light. In this way, the camera CD can be functionally engaged with the flash light device in any mode of operation, which is remarkably profitable.

Figure 5:
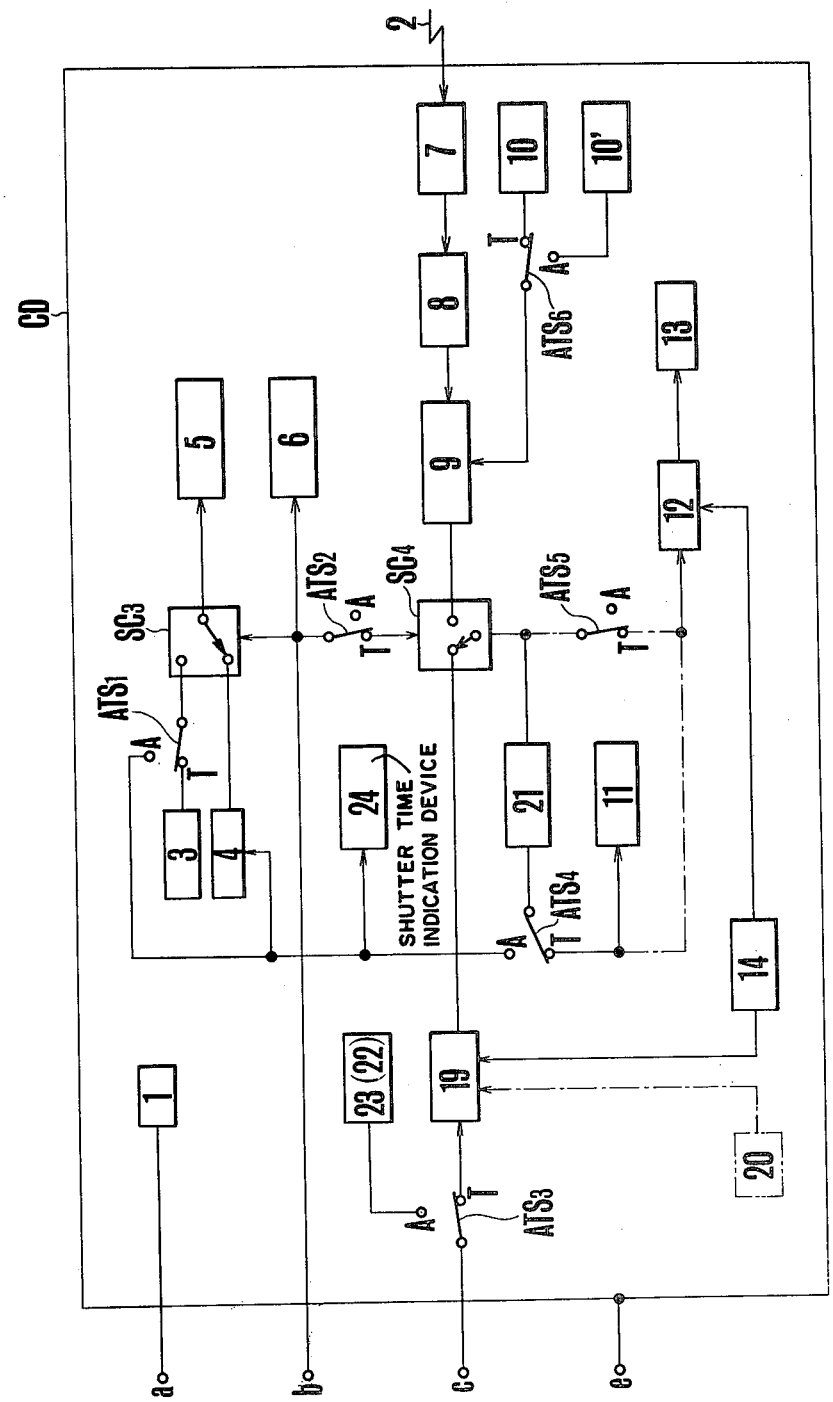
FIG. 5 shows a circuit diagram of an embodiment of the camera in accordance with the present invention, being used in functional engagement with various kinds of flash light devices.
Figure 6:
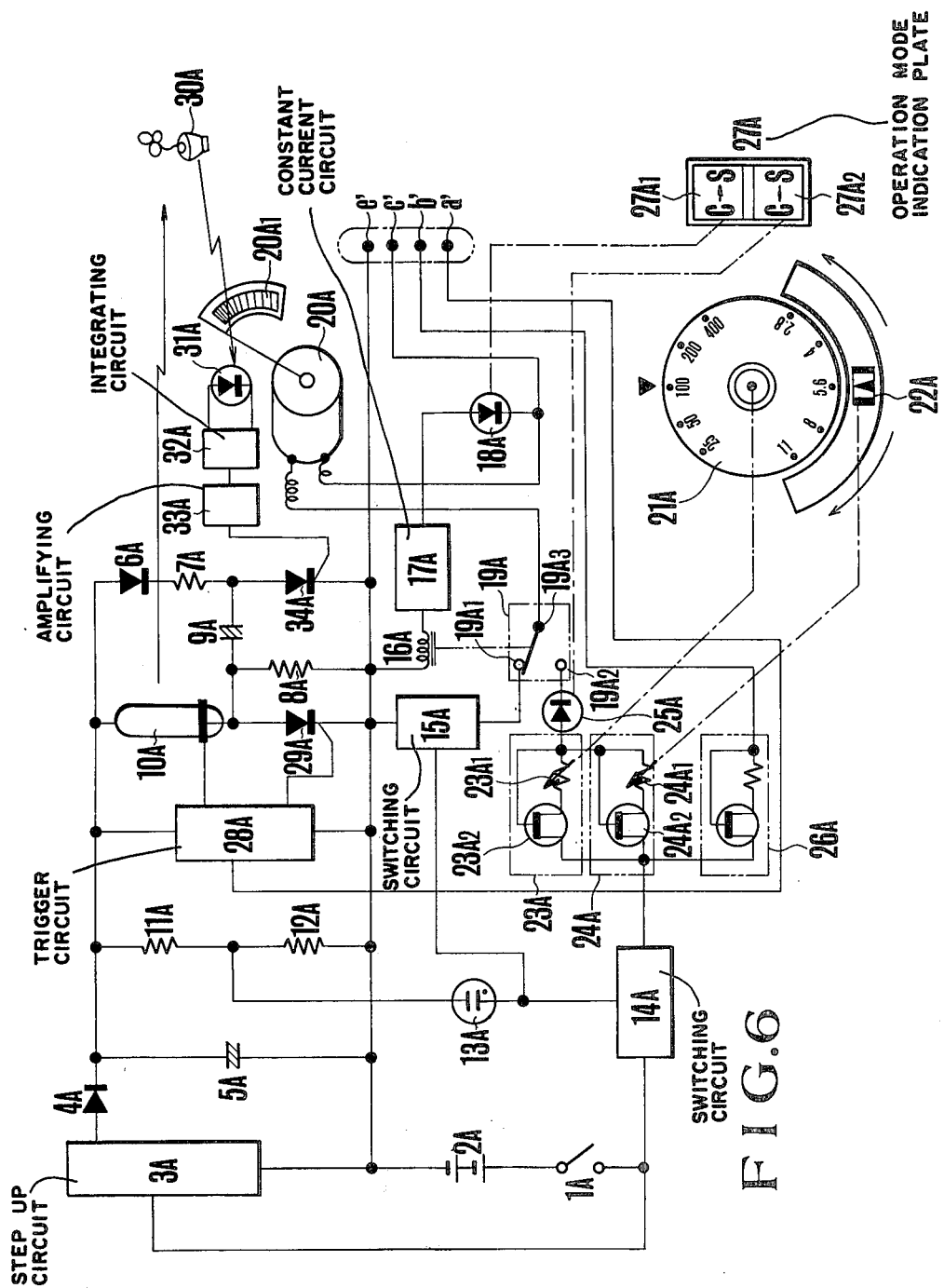
FIG. 6 shows a circuit diagram of an embodiment of the flash light device shown in FIG. 2.

Below the embodiments of the circuits of the flash light device and the camera will be explained in accordance with FIGS. 6 to 16. FIG. 6 shows a circuit diagram of an embodiment of the above mentioned flash light device SD, whereby as explained in accordance with FIG. 2 both the first flash light photographic mode with the camera CT (FIG. 3) and the second flash light photographic mode with the camera CA (FIG. 4) are possible which with the camera CD (FIG. 5) the first and the second flash light photographic mode are possible. In the drawing, 1A is the current source switch, whereby when the current source switch 1A is closed, the current from the current source 2A is step up by the step up circuit 3A, rectified by the diode 4A and supplied to the main condenser 5A while the condenser 9A for series control is charged through the diode 6A, the resistances 7A and 8A. When the charge voltage of the main condenser 5A reaches a certain determined value at which the flash light tube 10A can be actuated, the voltage divided by the resistance 11A and 12A is applied to the neon tube 13A presenting the switching characteristics so as to light it up while the charge completion is indicated at the side of the flash light device, the switching circuits 14A as well as 15A being closed.

When on the other hand, a voltage from the side of the camera is applied between the terminals e' and c' of the flash light device, being connected to the corresponding terminals at the side of the camera, a current runs from the terminal e' to the terminal c' through the relay 16A, the constant current circuit 17A and the illuminating diode 18A presenting the rectifying characteristics as diode in such a manner that the above mentioned diode 18A lights up while the contacts 19A$_1$ and 19A$_3$ of the switch 19A are brought in the connected state by means of the above mentioned relay 16A. In this way, a current runs between the terminals e' and c' through the switching circuit 15A closed by the neon tube, the switch 19A and the ampere meter 20A, whereby the current value is controlled by the aperture information producing device at the side of the camera so that the aperture information is delivered from the side of the camera to the side of the flash light device.

In case the camera to be connected to the flash light devices is either the above mentioned camera CA or the above mentioned camera CD set in such state the switch 19A is set to the side of 19A$_1$ by means of the relay 16A as mentioned above, while in case the camera is either the above mentioned camera CT or the above mentioned camera CD set in the reversed state no current is supplied between the above mentioned terminals e' and c' from the side of the camera so that the relay 16A does not operate in such a manner that the contacts 19A$_2$ and 19A$_3$ of the switch 19A remain connected to each other. In this case, the variable resistances 23A$_1$ and 24A$_1$ are adjusted respectively in functional engagement with the film speed setting plates 21A and the flash light amount level setting plate 22A provided in the flash light device in such a manner that by means of operation of the constant current circuits 23A and 24A respectively consisting of the above mentioned variable resistances FET 23A$_2$ and 24A$_2$ a current corresponding to the set value of 21A and 22A is supplied from the terminal c' to the side of the camera through the diode 25A, the switch 19A and the ampere meter 20A. The aperture information signal produced at the terminal c' out of the current from the current source 2A is the signal compressed in accordance with the circuit characteristics at the side of the camera, for example, the so called APEX signal which varies by a certain determined value for one step number variation of the diaphragm.

Below other compositions of the flash light device and their functions will be explained. When the charge has been completed after the closure of the current source switch 1A the neon tube 13A at the side of the flash light device lights up so as to indicate the completion of the charge while the switching circuit 14A is closed so that the charge completion signal is produced at the terminal b' through the constant current circuit 26A. Thus the shutter time control circuit, the indication and the alarm circuit at the side of the camera are changed over into the operation state for the flash light photography while in the view finder the charge completion is indicated.

In case the camera connected to the flash light device is the above mentioned camera CT or the above mentioned camera CD set in such state no current is supplied between the terminals e' and c' from the side of the camera as mentioned above so that the relay 16A does not operates and the switch is at the side 19A$_2$. In this way, the current corresponding to the set values of the film speed as well as the flash light level, namely the current corresponding to the aperture value to be adjusted from the side of the camera is produced at the terminal c' through the illuminating diode 25A, the switch 19A and the ampere meter 20A in such a manner that the diaphragm control circuit and the indication as well as the alarm circuit at the side of the camera come to operate in accordance with this aperture information. In this case, the current runs through the illuminating diode 25A, which lights up, whereby when it is so arranged that the above mentioned 25A illuminates 27A$_2$ of the operation mode indication plate 27A of the flash light device as shown in the drawing, it is indicated that the diaphragm at the side of the camera is in a position to be controlled in accordance with the set mode of the flash light device. In case on the contrary the flash light amount of the flash light device is controlled in accordance with the aperture value set at the side of the camera, the illumination diode 18A lights up as mentioned above so as to illuminate 27A$_1$ to indicate it.

When the shutter of the camera is released while the switch 19A is at the side 19A$_2$ as mentioned above, by means of the charge completion signal as well as the aperture information signal delivered to the side of the camera the diaphragm and the shutter an automatically control for the flash light photography. When the synchronization switch connected to the terminal a', at the side of the camera is closed synchronized with the operation of the shutter, the trigger circuit 28A of the flash light device is actuated through the common terminal e'. Not only the above mentioned flash light discharge tube 10A is triggered but also the switching element 29A is closed by means of the output pulse of 28A so that the flash light is produced by the flash light discharge tube 10A. On the other hand by the actuation of the flash light discharge tube 10A the light reflected by the object 30A to be photographed (or the direct light) reaches the light sensing element 31A through the light amount adjusting plate $20A_1$ provided on the above mentioned ampere meter 20A so as to adjust the amount of the passing light, being translated in accordance to the current value. The output of the light sensing element 31A is integrated by the integrating circuit 32A in such a manner that the switching element 34A is closed through the amplifying circuit 33A when the integrated output reaches a certain determined value. By means of the closure of the switching element 34A, the charge in the condenser 9A runs to the switching element 29A along the reversed direction so as to open the element. In this way, the flash light output of the flash light discharge tube 10A stopps.

As explained above in detail the diaphragm at the side of the camera is adjusted in accordance with the values set at the film speed setting plate 21A and the flash light amount level setting plate 22A provided in the flash light device while the flash light amount is controlled in accordance with the above mentioned set values delivered through the light amount adjusting plate $20A_1$ so as to obtain the proper exposure.

Below the case that the camera CA or the camera CD set in such state is connected with the flash light device will be explained. In this case a current corresponding to the aperture information is delivered between the terminals e' and c' from the side of the camera in such a manner that the illumination diode 18A lights up so as to illuminate $27A_1$, while the switch 19A is set to the side $19A_1$. When the neon tube 13A lights up and the switching circuit 15A is closed, a current corresponding to the aperture value at the side of the camera runs from the terminal e' to the terminal c' through 15A, 19A and 20A. As the result the aperture information is put in the flash light amount control circuit through the light amount adjusting plate $20A_1$ in such a manner that the flash light amount is controlled so as to obtain the proper exposure. During the above mentioned operation the switch 19A remains at the side $19A_1$ as mentioned above so that the set values at the setting plates 21A and 22A are not influenced at all and there take place no convenience.

To whichever, camera the flash light device shown in FIG. 6 may be connected the operation mode of the flash light device is automatically changed over so as to obtain the flash light amount for the proper exposure while the camera is automatically changed over for the flash light photography by means of the charge completion signal or the like, which is remarkably convenient.

Hereby as explained in accordance with FIG. 2, it is also possible to so design that a terminal d' for receiving the discrimination signal from the side of the camera is provided separately in such a manner that the current runs from the terminal d' to the terminal c' through 16A, 17A and 18A so as to change over the operation mode. In case the information of the film speed is put in the control circuit at the side of the camera CT even at the time of taking a photograph under flash light it is possible to eliminate the above mentioned constant current circuit 23A while the information is not put in the control circuit at the side of the camera CA it is necessary to provide such a constant current circuit as 23A for the film speed information in the circuit together with the switching circuit 15A.

In the above mentioned embodiment the switch 19A which is automatically changed over by means of the relay 16A, whereby it is also possible to compose the switch 19A as a manual change over switch, eliminating the relay 16A. In this case, the indication of the operation mode or the set state by means of the illuminating diodes 18A and 25A and the operation mode indicating plate 27A is very effective.

So far an embodiment of the circuit of the flash light device SD has been explained, whereby other flash light devices such as ST or SA in FIG. 1 are realized by altering a part of the circuit shown in FIG. 6 so that their drawing are omitted. Below the flash light devices ST or SA will be explained briefly. In FIG. 6, the switch 19A is eliminated while $19A_2$ and $19A_3$ are connected firmly to each other so as to realize the flash light device ST. It goes without saying that in this case, the above mentioned 15A to 18A can be abolished. Further the switch 19A is eliminated while $19A_1$ and $19A_3$ are connected firmly so as to realize the flash light device SA. It goes without saying that also in this case not only the above mentioned 23A to 25A but also 16A to 18A can be abolished. If the illumination diodes 18A remains connected between the terminals e' and c' even in case of the flash light device ST, it is indicated by lighting up of 18A when the diode 18A is connected to the camera CA by mistake while it is indicated by lighting up of 25A when the operation is carried out correctly. Further in case of the flash light device CA by lighting up of the illumination diode 18A that the operation is carried out correctly while when the diode does not illuminate it is indicated that the operation is impossible.

Figure 7:
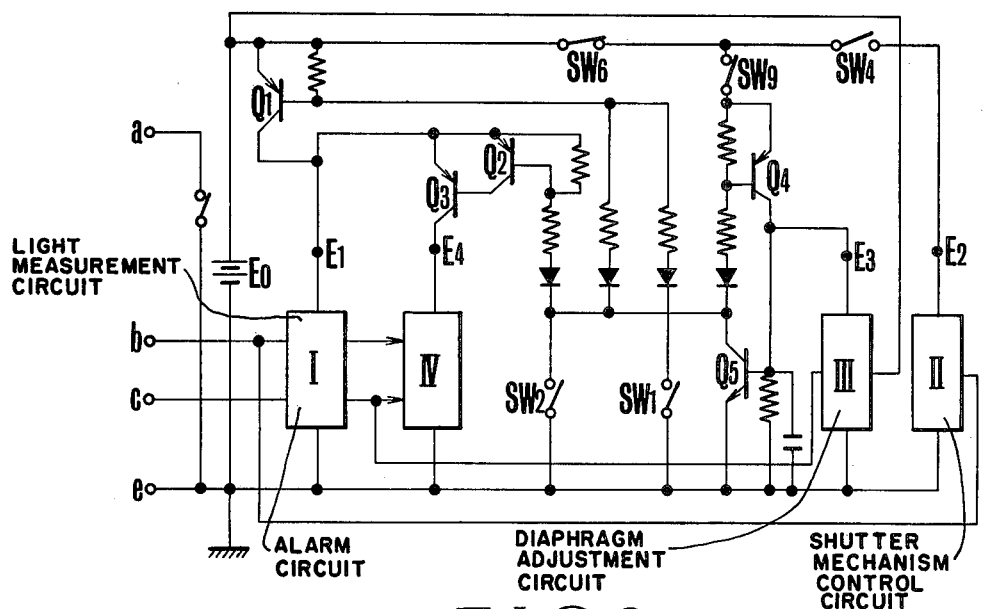
FIG. 7 shows a circuit diagram of an embodiment of the camera with priority on shutter time shown in FIG. 3.

The circuit diagram of the embodiment of the camera CT shown in FIG. 3 is indicated in FIG. 7 to FIG. 11 in detail. FIG. 7 shows a circuit diagram for explaining mainly the current supply circuit in the device at the side of the camera shown in FIG. 3. In the drawing Eo is the current source of the camera for supplying the current for the circuits I, II, III and IV. I is the first circuit which carries out the light measurement and the operation in case of the day-light photography or the operation as well as the charge completion indication corresponding to the input information from the flash light device in case of the flash light photography whereby only in case the charge completion signal from the flash light device is put in the circuit, the circuit is automatically changed over into the flash light photographic mode. II is the second circuit which controls the shutter mechanism in accordance with the shutter time set at the shutter time setting dial in case of the day-light photography or is automatically changed over so as to control the shutter mechansim in accordance with shutter time (for example 1/60 sec.) suitable for the flash light photography in case of the flash light photography. III is the third circuit for adjusting the diaphragm of the photographic lens up to the aperture value set for the day-light photography as well as the flash light photography in accordance with the input from the first circuit I, consisting of the circuit for controlling the starting time of the rise of the mirror and the electronic self timer circuit. The fourth circuit IV is the alarm circuit for indicating the aperture value adjusted in case of the day-light photography as well as the flash flight photography in accordance with the input from the first circuit I and for alarming in case the aperture value is out of the adjustable range. The informations to be put in the circuit at the side of the camera in the drawing from outside are the information from the flash light device, the object brightness information from the light sensing element, and the film sensitivity information as well as the shutter time information manually set.

Below the outline of the operation of the camera CT will be explained in accordance with the circuit shown in FIG. 7, at the first step of the release operation of the shutter the switch $SW_1$ is closed, when the transistors $Q_1$ and $Q_3$ are brought into the switched on state in such a manner that the first and the fourth circuit are supplied with current from the current source. In this way, an output corresponding to the object brightness information from I or the information from the flash light device are put in the circuit W. Thus the determined aperture value is indicated or when the value is out of the adjustable range of the diaphragm of the interchangeable lens mounted the alarm is indicated. Then at the second step of the release operation of the shutter the switch $SW_2$ is closed, when the transister is brought in the switched off state so as to interrupt the current supply to the fourth circuit while the transistor $Q_4$ is brought in the switched on state so as to supply current to the third circuit through the switches $SW_6$ and $SW_9$. Thus the magnet of the holding circuit III operates where by the mirror is raised up. The switch $SW_4$ is closed during the upward movement of the mirror so as to supply current to the second circuit II. About at this time, the magnet for controlling the diaphragm, of the third circuit in such a manner that the diaphragm of the photographic lens is adjusted down to the determined aperture value in accordance with the input from the first circuit I. After the rising up of the mirror and the adjustment of the diaphragm the front shutter plane starts to run, whereby at the same time the time count starting switch is opened, the second circuit in awaiting state starts to operate, after the elapse of a certain determined time the magnet for controlling the rear shutter plane operates and the rear shutter plane closed so as to complete the exposure. After that a series of operations such as the fall of the mirror take place whereby during the downward operation of the mirror the switch $SW_4$ is opened. Hereby the switch $SW_6$ is the one for preventing the misoperation which closes with the completion of the film winding up and opens with the start of the rear shutter plane, while the switch $SW_9$ is the one for economizing the current which closes only immediately after the start of the film winding up. When after the completion of the first exposure the film is wound up manually or by means of the motor drive device the shutter mechanism is charged and all the mechanisms are brought in the initial state.

In the above mentioned operations the diaphragm adjusted by the third circuit III or the shutter time controlled by the second circuit II respectively the aperture and the shutter time for the flash light photography, in case the flash light device is connected to the terminal a-e in a state ready for operation, in such a manner that the flash light device is actuated by means of the synchronization switch to be closed at the same time with the operation of the shutter. Even in case the photographer puts his hand away from the shutter button after the start of the mirror mechanism and others after the operation of the magnet in the holding circuit of the third circuit III, the output information of the first circuit is stored in the memory circuit and a correct operation is carried out smoothly by means of the self-holding circuit such as condenser inserted to the base of $Q_5$ shown in the drawing. The current circuit keeps to supply current to the second circuit by means of the switches $SW_6$ and $SW_4$ until the completion of the operation.

Figure 8:
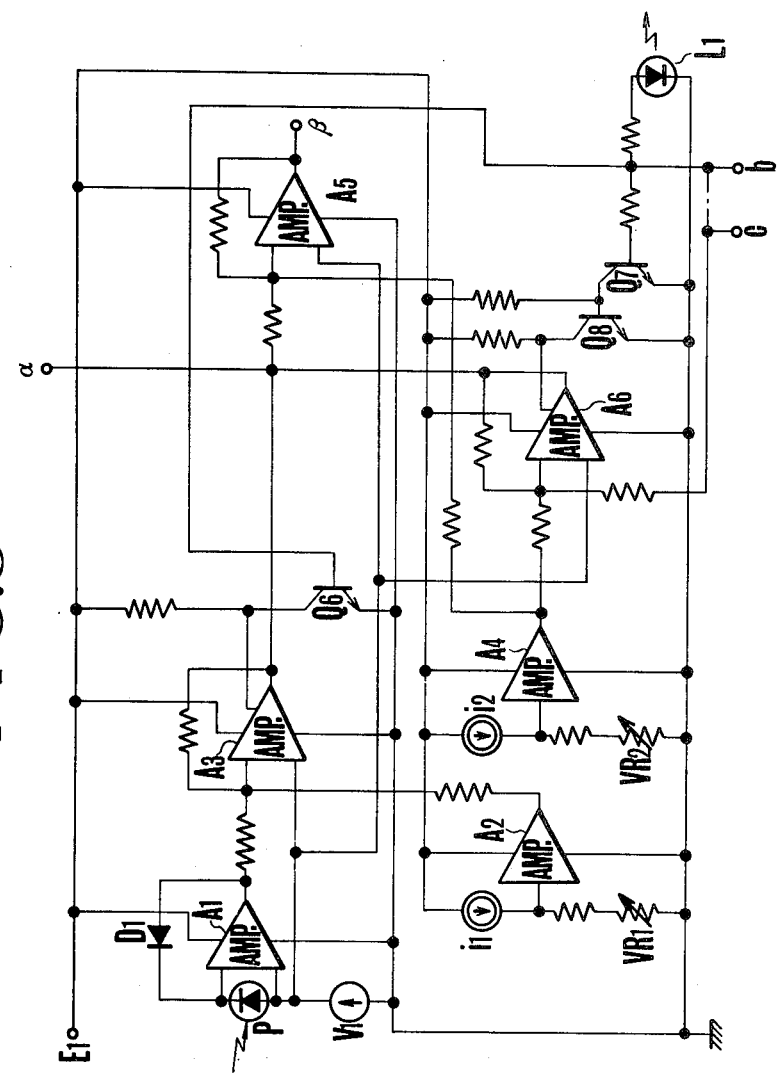

FIGS. 8 to 11 respectively show the detailed diagrams of the first to the fourth circuit shown in FIG. 7. In FIG. 8, P is the light sensing element, whereby a photoelectric transducing element such as silicone blue cell is arranged in the view finder optical system of the TTL system. $A_1$ is the amplifier (for example) of the light measurement circuit, in whose feed back route a logarithm diode $D_1$ is connected so as to obtain the logarithmically compressed output. $A_2$ is the amplifier of the photographic information setting circuit, whereby the film shutter, the shutter time as well as the compensation of vignetting due to the TTL totally opened light measurement are set at the variable resistance $VR_1$ connected to the input terminal of the amplifier $A_2$ in such a manner that the output of $A_2$ is combined with that of $A_1$ and put in the amplifier $A_3$ of the operation circuit. The above mentioned informations are all operated by the operation amplifier $A_3$ at whose output terminal 2 the information of the diaphragm step number is produced. This aperture information is put in the diaphragm control circuit shown by IV in FIG. 7. The output of the amplifier $A_3$ is combined with that of the amplifier $A_4$ of the second information setting circuit to whose input terminal a variable resistance $VR_2$ is connected on which the totally opened aperture value F of the photographic lens is set and put in the second operation amplifier $A_5$, at whose output terminal $\beta$ a signal corresponding to the absolute aperture value is produced. $A_6$ is the operation amplifier operating at the time of taking a photograph under flash light whereby $Q_6$, $Q_7$ and $Q_9$ are the switching transistors to be inversed by means of the charge completion signal from the flash light device for opening and closing the bias of $A_3$ and $A_6$. $L_1$ is an illumination diode or a lamp arranged at a proper place in the view finder optical path, which lights up at the termination of the charge of the flash light device so as to tell the photgrapher that the flash light device is ready for operation.

The operation of the circuit shown in FIG. 8 is as follows. In case the flash light device is not connected to the circuit or even if the flash light device is connected to the circuit the charge has not yet been completed, no voltage is applied to the input terminal b connected to the flash light device so that the operation amplifier $A_3$ is in the operation state by means of the effect of the bias control transister $Q_6$, $Q_7$ and $Q_8$, while the operation amplifier $A_6$ remains out of the operation state. Thus the automatic exposure control with priority on shutter time is carried out by means of the information connected to the object brightness information to be put in the light sensing element. In case of the TTL totally opened light measurement the amount of the light incident to P is the composed value of the object brightness (Bv), the totally opened aperture value (Avo) of the photographic lens and the vignetting (Avc) taking place when the lens of the light measuring optical system is especially bright. In consequence, at the terminal of the operation amplifier $A_1$ presenting a compression characteristics, the information in form of APEX value, namely (Bv−Avo−Avc) is produced. Further at the variable resistance $VR_1$ connected to the amplifier $A_2$, the film speed (Sv), the shutter time (Tv) and the vignetting compensation (Avc) put in by means of the compensating pin of the photographic lens are set and therefore at the output terminal of the amplifier $A_2$ their composed value $(Sv+Avc-Tv)$ is produced. The output of the amplifier $A_1$ is combined with that of the amplifier $A_2$ and put in the amplifier $A_3$. At the output terminal of the amplifier $A_3$, the information $(Bv+Sv-Tv-Avo)$ is produced. This is $(Av-Avo)$, the diaphragm step number signal for showing the number of the steps by which the photographic lens is to be adjusted from the totally opened value E. This information is produced at the output terminal $\alpha$. On the other hand, the totally opened F value information set on the variable resistance $VR_2$ of the photographic lens is produced by the amplifier $A_4$, combined with the output $(Av-Avo)$ of the above mentioned amplifier $A_3$ and put in the operation amplifier $A_5$ at whose output terminal the absolute aperture value $(Av)$ is produced. This information Av is produced at the output terminal $\beta$ of the operation amplifier $A_5$ and put in the indication - alarm circuit. When the flash light device is ready for operation, the charge completion signal is put in the terminal b from the flash light device, whereby by means of the effect of the above mentioned change over transister the amplifier $A_3$ is brought in the non-operation state while the amplifier $A_6$ is brought in the operation state, whereby the indication diode (or the lamp) $L_1$ light up to as to tell the photographer that the charge has been completed. After the operation of the flash light device by triggering the charge completion signal to the terminal b is interrupted for a while, so that the diode extinguishes for a while in such a manner that the operation of the flash light device can be confirmed through the view finder. In this case the amplifier is in the non-operation state and therefore no information corresponding to the object brightness is produced either at the output terminal $\alpha$ nor at the terminal $\beta$ while the output corresponding to the aperture information put in from the flash light service through the input terminal c is produced. The absolute aperture value signal from the flash light device and the totally opened F value from the amplifier $A_3$ are put in the operation amplifier $A_6$ at whose output terminal the diaphragm step number information $(Av-Avo)$ is produced and delivered to the diaphragm control circuit from the terminal $\alpha$. On the other hand the diaphragm step number signal and the totally opened F value signal from the amplifier $A_4$ is put in the amplifier $A_5$ at whose output terminal a signal corresponding to the absolute aperture value to be adjusted is produced and delivered to the indication—alarm circuit from the terminal $\beta$.

As explained above, the circuit shown in FIG. 8 is driven by the current source $E_1$ in such a manner that the operation mode is automatically changed over either for the day-light photography or for the flash light photography and a necessary information is produced either at the terminal $\alpha$ or at the terminal $\beta$.

Figure 9:
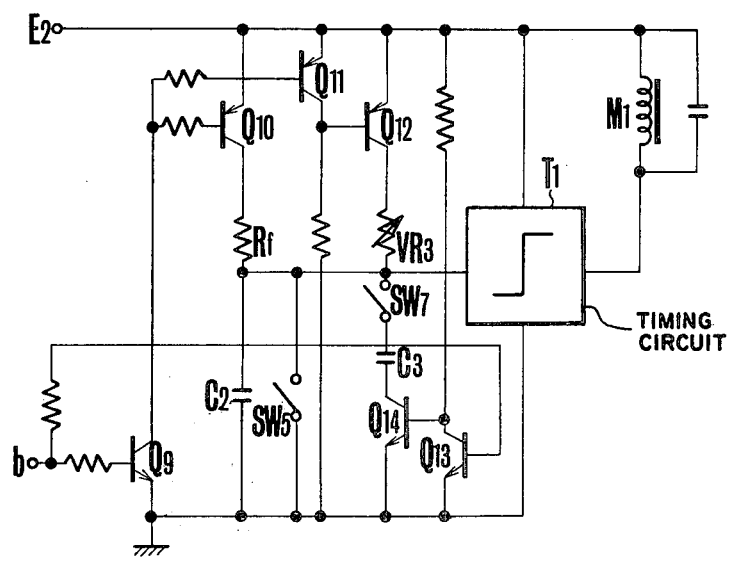
FIGS. 8 to 11 respectively show the circuit diagram of an embodiment of the first, the second, the third and the fourth circuit part.

FIG. 9 shows the detailed diagram of the second circuit shown in FIG. 7. This circuit is supplied with a current from the current source $E_2$, while the charge completion signal is put in the input terminal b from the flash light device. In the drawing, $VR_3$ is a variable resistance to be set in functional engagement with the shutter time setting dial, $c_2$ and $c_3$ the time constant condensers which are connected in parallel by means of the switch $SW_7$ to be closed depending upon the set range of the above mentioned shutter time setting dial in case of the long time photography. $T_1$ is a timing circuit such as Schmitt circuit, $M_1$ is the magnet for controlling the starting time of the rear shutter plane, $SW_5$ the time count starting switch and Rf the time constant resistance element for obtaining the time suited for the flash light photography whereby when the charge completion signal is put in from the terminal at the time of taking a photograph under flash light the resistance $VR_3$ is changed over to the resistance Rf in the time constant circuit by means of the effect of the transisters $Q_9-Q_{12}$ so as to obtain a shutter time for example 1/60 sec. Hereby the transisters $Q_{13}$ and $Q_{14}$ are intended to cut the condenser $C_3$ from the circuit independent of the mode of the switch $SW_7$ at the time of taking a picture under flash light. The operation of the circuit shown in the drawing is as follows. In case of the day-light photography a current is supplied to the circuit from the current source $E_2$ whereby no charge completion signal is put in the terminal b from the flash light device so that the transistors $Q_{10}$ and $Q_{11}$ is in the switched off state, while the transister $Q_{12}$ is in the switched on state so as to connect the variable resistance $VR_3$ to the circuit. At the same time, when the front shutter plane is released so as to start to run, the switch $SW_5$ is opened, the condenser $C_2$ (or $C_2$ and $C_3$) is charged through the variable resistance $VR_3$, after the elapse of a certain determined time, the timing circuit $T_1$ is inversed, the magnet $M_1$ operates and the rear shutter plane starts to run so as to close the shutter. In case of the flash light photography, the charge completion signal is put in the terminal b whereby the transisters $Q_9$ and $Q_{10}$ are in the switched on state while the transister $Q_{12}$ is in the switched off state, so that instead of the variable resistance $VR_3$ the resistance Rf is connected to the circuit, while the transister $Q_{13}$ is in the switched on state and the transister $Q_{14}$ is in the switched off state so that only the condenser $C_2$ is connected to the time constant circuit. In this way with the shutter time decided by the resistance Rf and the condenser $C_2$, namely the shutter time suitable for the flash light phototgaphy the timing circuit $T_1$ is inversed so as to carry out the exposure. This change over of the shutter time is automatically carried out, any misoperation due to the negligence of the shutter time or the eventual movement of the set component can take place.

Figure 10:
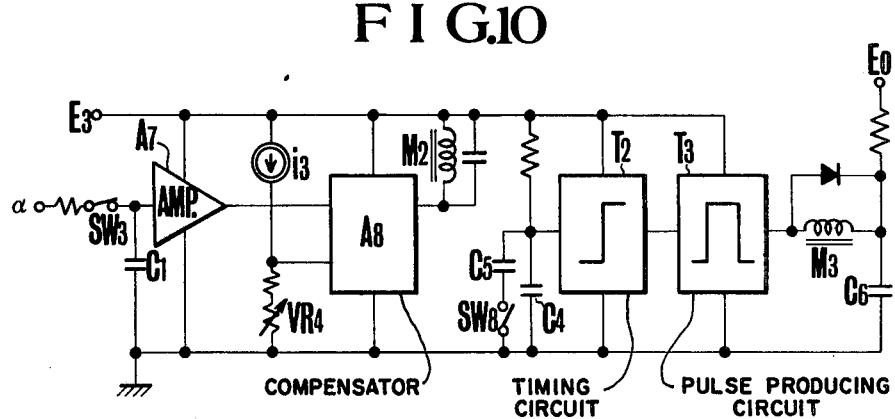

FIG. 10 shows the detailed diagram of the third circuit shown in FIG. 7. A current is supplied to this circuit from the current source Eo through the swithches $SW_6$ and $SW_9$ while another current is also supplied to a part of this circuit directly from the current source Eo whereby the electrical power is very small. Further, the diaphragm step number information $(Av-Avo)$ corresponding to the object brightness from the first circuit or the information from the flash light device is put in the input terminal $\alpha$. The diaphragm step number signal put in the terminal $\alpha$ is applied to the memory condencer $C_1$ through the memory switch $SW_3$, so as to be stored there. After the storing the voltage of the condenser $C_1$ is kept even if the switch $SW_3$ is opened. The diaphragm step number signal stored in the condenser $C_1$ is put in the compensator $A_8$ through the buffer $A_7$. $i_3$ is the constant current source for the variable resistance $VR_4$, whereby the signal from the resistance $VR_4$ variable in accordance with the number of the steps by which the photographic lens is adjusted from the totally opened F value is compared with the stored step number signal from the above mentioned amplifier $A_7$ by the comparater $A_8$ in such a manner that when the both signals corresponds with each other the diaphragm control magnet $M_2$ is operated by means of the output of the comparator $A_8$. $C_4$ is the time constant condenser for delaying a little the operation time of the magnet $M_3$ in the holding circuit, while $C_5$ is the time constant condenser for closing the switch $SW_8$ so as to delay the operation time of the magnet $M_3$ for example by eight seconds in case the selftimer is used. $T_2$ is the timing circuit, $T_3$ the pulse producing circuit and $C_6$ the condenser for driving the magnet $M_3$. The operation of the circuit is as follows. At first the current source $E_3$ is connected by the release operation and after the elapse of a little time decided by $C_4$ and so on the timing circuit $T_2$ is inversed in such a manner that a pulse is produced at the output terminal of the pulse producing circuit $T_3$, so as to operate the magnet $M_3$. By means of the operation of the magnet $M_3$ the mirror starts to rise up and nearly at the same time the memory switch $SW_3$ opens. The aperture information stored in the memory condenser $C_1$ and the signal from the resistance $VR_4$ variable in accordance with the displacement amount of the diaphragm preset member of the photographic lens to be operated after the operation of the magnet $M_3$ are put in the comparator $A_8$, so as to be compared with each other there in such a manner that when the both signals correspond with each other the magnet $M_2$ operates so as to determine the stopping position of the diaphragm preset member. By means of this position the diaphragm of the photographic lens is adjusted at the determined value by the operation of the automatic diaphragm lever at the time of taking a photograph. In stead of engaging the variable resistance $VR_4$ with the diaphragm preset member, the resistance $VR_4$ can be engaged with the member connected directly with the diaphragm blades. Hereby as the mechanisms for operating the magnet $M_2$ and adjusting the diaphragm of the photographic lens, the device mentioned in the Japanese Patent Application Sho 47-123633 applied by the applicant of the present invention can be utilized.

In case of the self-timer photography, the switch $SW_8$ is closed by the manual operation so as to delay the operation time of the magnet $M_3$ for example by eight seconds.

Figure 11:
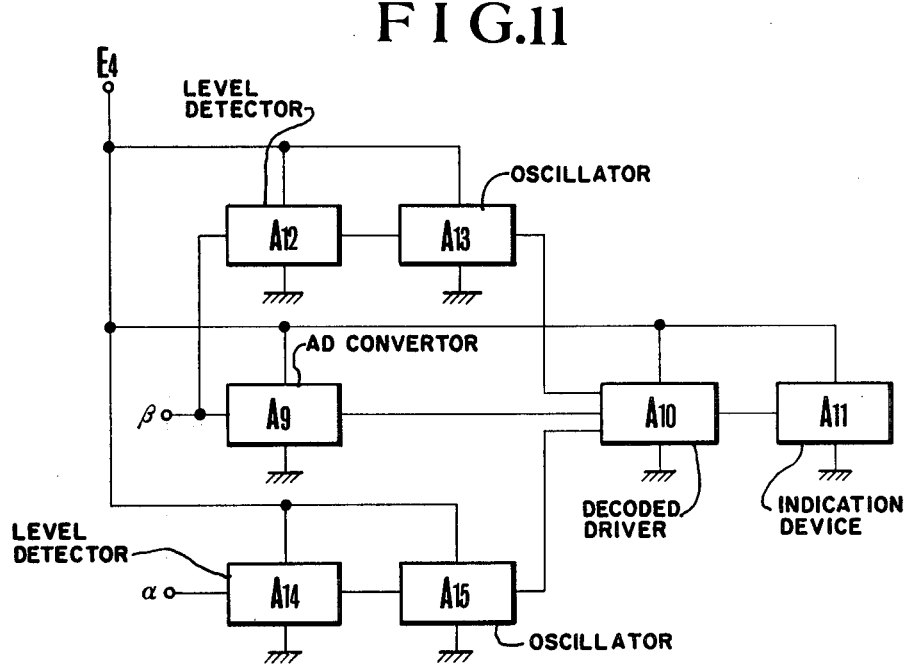

FIG. 11 shows the detailed diagram of the fourth circuit shown in FIG. 7. A current is supplied to this circuit from the current source $E_o$ through the transistor change over circuit, while the diaphragm step number signal as well as the absolute aperture value signal are put in this circuit from the first circuit through the input terminals $\alpha$ and $\beta$. The current is supplied to this circuit between the closure of the switch $SW_1$ functionally engaged with the first step of the release and the closure of the switch $SW_2$ functionally engaged with the second step of the release. In the drawing, $A_9$ is the AD-converter for converting the analog signal of the aperture put in the terminal $\beta$ into a digital signal, whereby the digital signal produced at the output terminal is decoded by the decoded driver $A_{10}$ into a signal suited for indication so as to be applied to the indication device $A_{11}$. $A_{11}$ consists of for example seven segment illumination diode elements, whereby the aperture value corresponding to the absolute aperture value signal put in the terminal $\beta$ is indicated in letter figures, when this indication reaches the aperture limit value, for example $F_{22}$ or more, the level detector $A_{12}$ detects the fact so as to control the oscillator $A_{13}$ to make the indication by the indication device $A_{11}$ twinkle for alarm. On the other hand, the diaphragm step number signal put in the terminal $\alpha$ is detected by the level detecter $A_{14}$ in the same way in such a manner that when the signal reaches the limit value for example F1.4 or more of the mounted photographic lens the oscillator $A_{15}$ is controlled so as to make the indication by the indication device $A_{11}$ twinkle for alarm. Also in case of the flash light photography the signal put in the terminal $\alpha$ and $\beta$ is automatically changed over in the first circuit so that the indication and the alarm are carried out in the same way as mentioned above. Hereby the circuit shown in FIG. 11 is so designed that the aperture indication device twinkles for alarm, whereby the alarm can be made by extinguishing or darkening the indication device. Further it is possible to provide another alarm indication device. Further it is possible to indicate the aperture not by the lamp indication but by an ampere meter.

As explained above in case of the camera CT shown in FIGS. 7 to 11 at the time of taking a photograph under the daylight at the first step of the release operation the aperture value to be adjusted by the film speed, the shutter time and the object brightness is indicated while it is also alarmed when the value is out of the adjustable range, and at the second step of the release operation the diaphragm of the photographic lens is automatically adjusted to the above mentioned value while the shutter operates with the set time for obtaining the proper exposure. At the time of taking a photograph under flash light by means of the flash light device ST or SD all the circuits for indication and alarm, the diaphragm control as well as the shutter time control are automatically changed over for the flash light photography while the charge completion signal is indicated in the view finder at the time of taking a photograph under flash light.

Below an embodiment of the circuit showing in detail the camera in the embodiment shown in FIG. 4 will be explained in accordance with FIG. 12(a).

In the drawing, 101 is the current source of the camera and 102 the current source switch. In case of this cambera the common terminal e with the flash light device is, as is shown in the drawing, connected to the positive electrode of the current source contrary to the above mentioned camera CT. 103 is the light sensing element, whereby a photoelectric converting element such as silicone blue cell is arranged in the view finder optical system of the TTL system, 104 is the amplifier (for example an operation amplifier) of the light measuring circuit in whose feed back route a logarithm diode 105 is connected so as to obtain a logarithmically compressed output. 106 is the amplifier of the photographic information setting circuit, whereby at the variable resistance 107 connected to the input terminal of the amplifier the film speed, the number of steps by which the diaphragm is adjusted from the totally opened F value and the compensation of the vignetting due to the TTL totally opened light measurement are set while the output of the photographic information setting circuit 106 is combined with the output of the amplifier 104 and stored in the memory condenser 109 through the memory switch 108. The value stored in the memory condenser 109 assumes the same voltage for operating the shutter with the same time independent of the totally opened F value of the mounted interchangeable lens in case the preset aperture value and so on are same namely the photographic conditions are same. 110 is the constant voltage circuit for stabilizing the operation of the above mentioned circuit. 111 is the count starting switch to be opened at the same time of the operation of the front shutter plane, whereby when the switch 111 is opened the current corresponding to the voltage of the condenser 109 storing the time corresponding to the object brightness measured before through the memory switch 108 to be opened before the rising up of the mirror is charged in the condenser 113 through the transister 112. In this way, pulse corresponding to the shutter time enlarged up to the actual time is produced at the output terminal of the trigger circuit 114 and delivered to the magnet for controlling the starting time of the rear shutter plane. 115 is the AND circuit for the day-light photography without using a flash light, whereby the one input terminal 115a is connected to the output terminal of the trigger circuit 114 composing the above mentioned electronic shutter circuit while the other input terminal 115b is connected to the collector of the transister 116 to be brought in the switched on state by means of the charge completion from the flash light device in such a manner that an output is produced at the same time with the output of the above mentioned trigger circuit after the shutter release when the flash light device is not mounted on the camera or even if the flash light device is mounted the charge has not yet been completed. 117 is the control AND circuit for low speed whose input terminal presents the first input terminal 117a for the above mentioned charge completion signal, the second input terminal 117b for the current from the current source and the third input terminal 117c connected to the output terminal of the control time constance circuit for low speed consisting of the resistance 118 and the condenser 119. The AND circuit 117 is so designed as to produce an output in for example ½ sec. after the contact 121 is closed at the same time with the operation of the synchronization contact 120. 122 is the control AND circuit for high speed whose input terminal present the first input terminal 122a supplied with the above mentioned charge completion signal, the second input terminal 122b connected to the output terminal of the above mentioned trigger circuit and the third input terminal 122c connected with the output terminal of the control time constant circuit for high speed consisting of the resistance 123 and the condenser 124. At the output terminal of the AND circuit 122 an output is produced after the elapse of for example 1/60 sec. after the closure of the synchronization contact by means of the release operation of the shutter, 125, 126, 127 and 128 are the resistances, while 129 is a transister which is brought in the switched on state at the same time when the contact 121 is closed together with the synchronization switch 120 in such a manner that a control signal is applied to the gate of the switching element 130, so as to close the element 129. 131 and 132 are the transisters which are brought in the switched off state at the same time of the closure of the above mentioned element 130 in such a manner that the time constant circuit presenting the above mentioned condensers 119 and 124 is operated so as to start the counting. 133, 134 and 135 are the diodes, while 136 is the transister which is brought in the switched off state by means of the output of the above mentioned circuits 115, 117 and 122 so as to demagnetize the magnet 137.

Below the operation of the camera CA with priority on aperture shown in FIG. 12(a) will be explained in accordance with an embodiment. In case no flash light device is mounted on the camera or even if a flash light device is mounted the charge has not yet been completed, no voltage is applied to the terminal b to be connected to the flash light, being kept at the potential at the minus side of the current source 101 so that no input signal is delivered to the input terminal 117a and 122a of the AND circuits 117 and 122. In consequence the AND circuits 117 and 122 can never be brought in the AND state. On the other hand, the voltage of the current source is applied to the input terminal 115b of the AND circuit 115 by means of the closure of the current source switch 102 because the transister 116 is in the switched off state. When then the count starting switch 111 is opened at the same time with the start of the front shutter plane by means of the release operation of the shutter the condenser 113 is charged through the transister 112 with the current corresponding to the voltage of the condenser 109 storing the time corresponding to the object brightness as mentioned above. When the condenser 113 is charged up to a certain determined voltage the trigger circuit 114 operates whereby the potential at its output terminal becomes equal to that of the current source. The potential at the output terminal of the trigger circuit 114 is conveyed to the input terminal 115a of the AND circuit 115 so that the AND circuit 115 produces an output together with the input terminal 115b at the potential of the current source in advance. The output is applied through the diode 135 to the base of the transister 136 so as to open it so that the magnet 137 is demagnetized whereby in a conventional way the rear shutter plane is released so as to terminate the exposure. In case the flash light device is not yet ready for operation the ANd circuits 117 and 122 never operate while on the other hand, the trigger circuit 114 operates at a certain determined time in accordance with the object brightness, the preset aperture value, the film speed and so on whereby the AND circuit 115 operates at the same time with the trigger circuit 114 so as to obtain the proper exposure under the day-light.

In case either the flash light device CA or CD is mounted on the camera CA and the charge has been completed the charge completion signal is conveyed to the terminal b in such a manner that the illumination diode 138 provided in the optical path of the view finder of the camera illuminates for indication while the input signal is delivered to the input terminals 117a and 122a of the AND circuits 117 and 122. Then by closing the current source switch 102 of the camera the current source voltage is put in the input terminal 117b of the AND circuit 117. Hereby the current source voltage is applied between the collecter and the emitter of the transister 116 in such a manner that the base of the transister 116 is at a high potential by means of the above mentioned charge completion signal, so that the transister 116 is closed. In consequence the potential at the input terminal 115b of the AND circuit 115 is never raised whereby at taking a photograph under flash light the AND circuit 115 has nothing to do with the control of the shutter time. On the other hand, the output of the trigger circuit 114 is put in the input terminal 122b of the AND circuit 122 at a desired time in accordance with the object brightness in the same way as in case of the day-light photography, serving as the voltage of the current source. Further the input signal is put in the input terminals 117c and 122c of the AND circuit 117 and 122 after the elapse of the time determined by the resistance 118 and the condenser 119 or by the resistance 123 and the condenser 124 because either the transister 129 and the switching element 130 are closed or the transisters 131 and 132 are brought in the switched off state by means of the closure of the switch 121 at the same time with the synchronization switch 120 to be opened when the front shutter plane is totally opened.

The input terminals 117a and 117b of the AND circuit 117 are at the above mentioned potential so that after the elapse of the time determined by the resistance 118 and the condenser 119 the AND circuit 117 meet the AND condition so as to produce an output.

When now the time determined by the resistance 118 and the condenser 119 is set at the value corresponding to the time limit for the manual holding, for example ¼ sec., the AND circuit 117 produce an output after ¼ sec. after the start of the front shutter plane wihtout fail only at the time of taking a photograph under flash light whereby the transister 136 is brought in the switched off state through the diode 134 so as to actuate the magnet 137.

Hereby the input terminal 122a of the AND circuit 122 is at the above mentioned potential by means of the charge completion signal whereby the input signal is put in the input terminals 122b and 122c respectively at the above mentioned time. In consequence the AND circuit 122 produces an output by means of the one of the input signals respectively put in the input terminals 122b and 122c later than the other. When now the time determined by the resistance 123 and the condenser 124 is set at a value corresponding to the limit time for the flash light photography, for example 1/60 sec. in case of focal plane shutter, at the time of taking a photograph the AND circuit 122 produces an output after the elapse of more than 1/60 sec. after the start of the front shutter plane. Namely, the trigger circuit 114 operates at the desired time in accordance with the object brightness and so on in the same way as in case of the day-light photography whereby the output is put in the input terminal 122b of the AND circuit 122, whereby in case the signal corresponds to a shutter time shorter than 1/60 sec., an output is produced at the same time a signal corresponding to 1/60 sec. is put in the input terminal 1/60 sec., bringing the transister 136 in the switched off state through the diode 133 and actuating the magnet 137 so as to start the rear shutter plane. In case the time in accordance with the object brightness and so on is too long the AND circuit 122 produces an output at the same time with the operation of the trigger circuit 114.

Below the shutter operation in case of the flash light photography will be explained briefly, the operation of each of the above mentioned components being summarized. When the charge completion signal is put in the terminal b as mentioned above, the illumination diode 138 lights up for indication while the AND circuit 115 is changed over into non-operation state and the AND circuits are changed over into operation state. The AND circuit 117 produces an output at the time corresponding to the shutter time, namely ¼ sec., while the AND circuit 122 produces an output at the time corresponding to the shutter time, namely 1/60 sec. or produces an output at the same time with the trigger circuit 114 operating later. Further the output terminal of the AND circuit 117 and that of the AND circuit 122 are both connected to the base of the transister 136, which is brought in the switched off state by means of the one of the signals from the transisters 117 and 122 earlier than the other in such a manner that the magnet 137 is excited so as to start the rear shutter plane. In consequence when the object is so bright that the time determined by the result of the light measurement is very short, by means of the AND circuit 122 the shutter is operated with a time capable of the flash light photography for example 1/60 sec., while the object is so dark, by means of the AND circuit 117 the shutter is operated with the limit time for manual holding, for example ¼ sec. so as to prevent the inproper operation. Further in case the time determined by the result of the light measurement is between 1/60 sec. and ¼ sec., the shutter is operated by means of the output signal of the AND circuit 122 so that the object too distant to be illuminated by the flash light from the flash light device is photographed with proper exposure under day-light (including tangsten light). At the time of taking a photograph under flash light also the light from the flash light device is put in the light sensing element 103 of the above mentioned light measurement circuit, whereby the memory circuit 108 is opened before the operation of the flash light device so that there is no danger that the shutter time should become shorter, being influenced by the flash light.

At the time of taking a photograph under flash light the shutter at the side of the camera operates as mentioned above while the flash light device operates as follows. Between the terminal c at the side of the camera and the negative electrode of the current source 101 a constant current circuit consisting of a variable resistance 139 and a field effect transistor FET 140 is connected. The variable resistance 139 being so composed that its value is adjusted in accordance with the absolute preset aperture value and the film speed, the camera is connected to the above mentioned flash light device (FIG. 6), when a pressure is applied between the terminals e' and e at the side of the flash light device corresponding to the terminals e and c at the side of the flash light device from the current source 101. In this way, the flash light device is automatically changed over into the operation mode for the camera. Further the value of the current running from the terminal e' to c' of the flash light device is controlled by the above mentioned constant current circuit consisting of the variable condenser 139 and the field effect transistor FET 140 at the side of the camera so that the information of the conditions set at the side of the camera is put in the flash light device. When the release is operated in this state, the synchronization switch 120 closes when the front shutter plane is totally opened, whereby the terminals e' and a' of the flash light device are short circuited in such a manner the flash light is produced by the operation of the trigger circuit. As explained above, the informations corresponding to the light reflected from the object to be photographed, the aperture value of the diaphragm at the time of taking a photograph and so on are put in the flash light amount control circuit of the flash light device so as the flash light output is ceased at the time point at which the flash light amount for giving the proper exposure amount to the film is reached. After that the shutter closes after the time determined for the flash light photography.

Figure 12A:
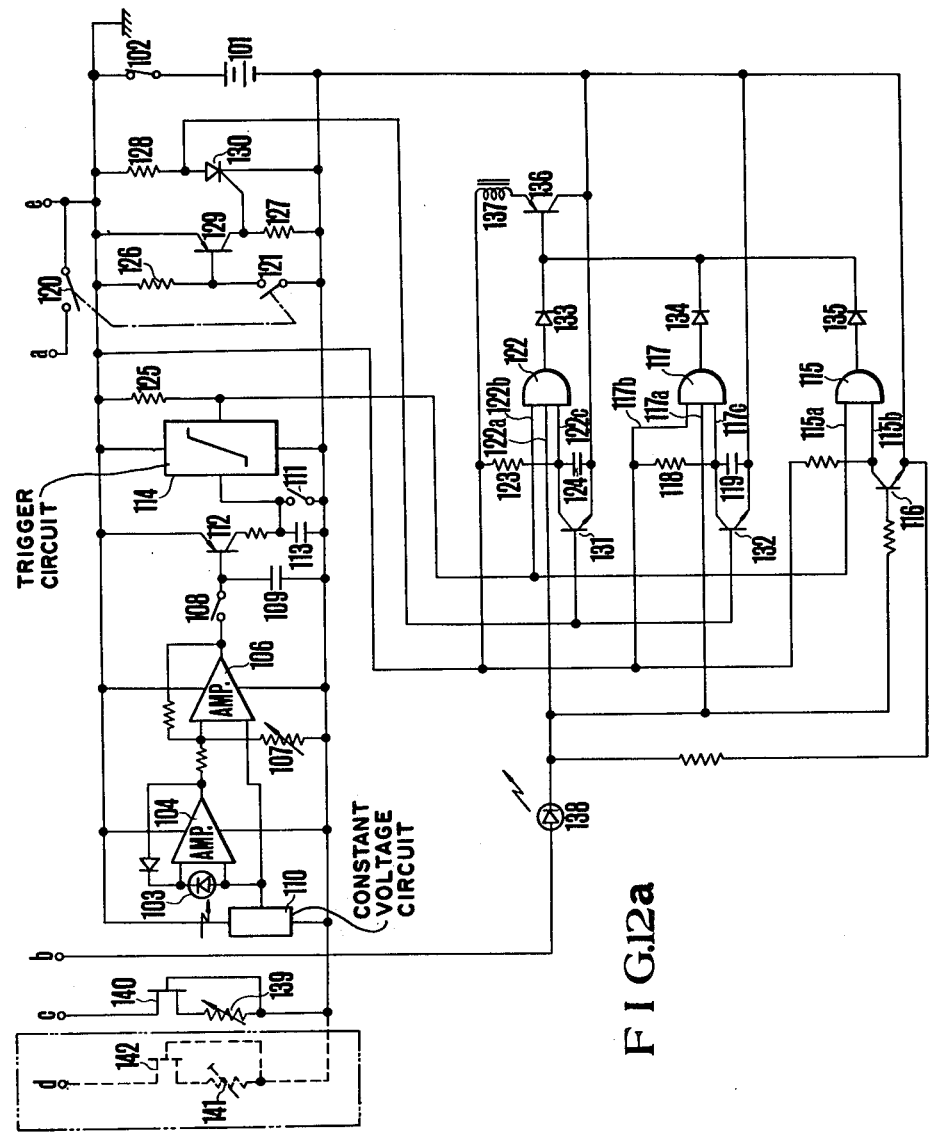
FIG. 12(a) shows a circuit diagram of an embodiment of the camera with priority on aperture value shown in FIG. 4.

The constant current circuit consisting of the resistance 141 and the field effect transistor FET 142 shown by dotted line in FIG. 12(a) corresponds with the discrimination signal producing device 22 shown in FIG. 4, whereby in case the terminal d is provided as shown in the drawing instead of c the illumination diode 18A of the flash light device shown in FIG. 6 is disconnected from the terminal c' and connected to the newly provided terminal d'.

As explained above, the camera CA shown in FIG. 12(a) acts as an auto exposure camera with priority on aperture in case of the day-light photography, while in case of the flash light photography the aperture information and so on necessary for the flash light device is produced so as to control the flash light amount whereby the shutter time is adjusted for the flash light photography so as to obtain the proper exposure automatically.

Figure 12B:
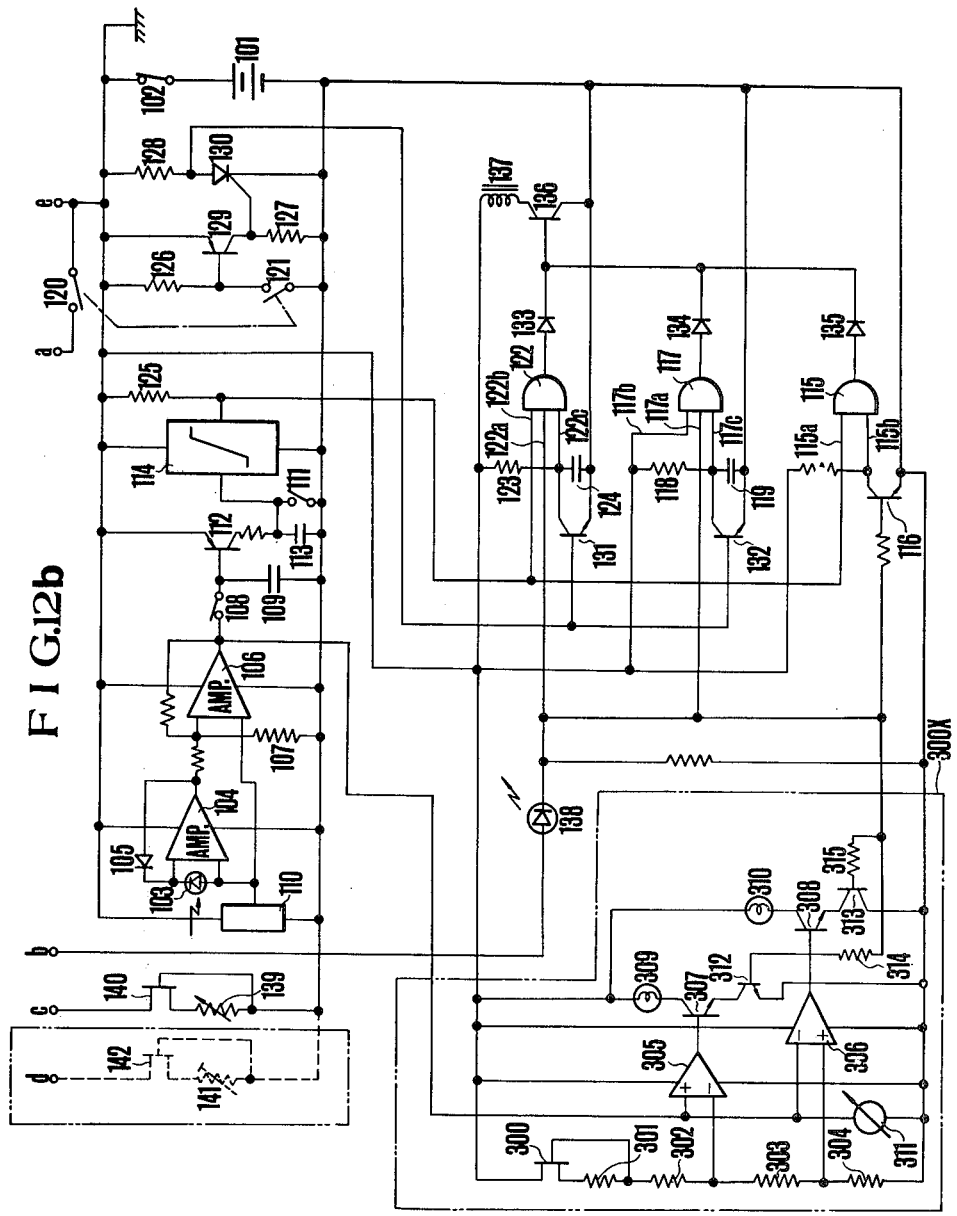
FIG. 12(b) shows a circuit diagram of a variation of the camera shown in FIG. 12(a).

FIG. 12(b) shows a variation of the camera CA shown in FIG. 12(a). In case of the flash light photography, the shutter time is limited, whereby it is indicated by a newly added circuit 300X. In the present embodiment, the shutter speed at the side of high speed is limited up to 1/60 sec. so as to be applied for the focal plane shutter, whereby the limit value of the shutter time is indicated. The shutter speed at the side of the low speed is limited up to $\frac{1}{4}$ sec. the limit of the manual holding being taken into consideration, whereby the limit value of the shutter time is indicated. In the drawing FET 300 and the resistance 301 compose a constant current circuit. 302 and 304 are the resistances for setting level. The voltage at the positive side of 304 is the non-inversed input voltage of the comparator 306, being set at a level equivalent to the output voltage of the amplifier 106 in case the shutter time is 1/60 sec. The voltage at the positive side of the resistance 304 is the inversed input voltage of the comparator 305, being set at a level equivalent to the output of the amplifier 106 in case the shutter time is $\frac{1}{4}$ sec. 309 and 310 are the alarm lamps showing that the shutter time is at the limit value.

Figure 12C:
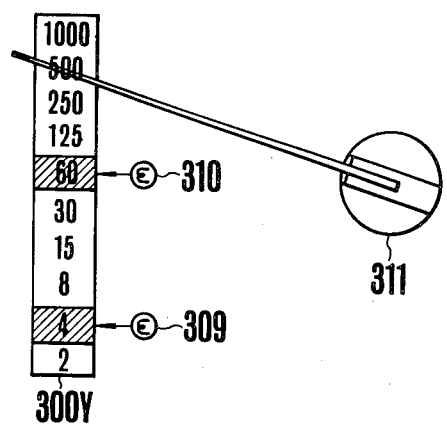
FIG. 12(c) shows the then mode of indication.

FIG. 12(c) shows the above mentioned state. In the drawing, 300Y is the shutter time indicating part, 311 the ampere meter, 309 and 310 the above mentioned alarm lamp.

The operation of the compositions shown in FIG. 12(b) and (c) is as follows. In case the shutter time at the time of the auto-exposure with priority on aperture is shorter than 1/60 sec. the output voltage of the amplifier 106 is lower than the voltage at the positive side of the resistance, whereby the comparator 306 is inversed so as to bring the transistor in the switched on state in such a manner that the limit alarm lamp 310 in the indication part of 1/60 sec. lights up for alarming. In case the shutter time at the time of auto-exposure with priority on aperture is longer than $\frac{1}{4}$ sec., the output voltage the amplifier 106 is higher than the voltage at the positive side of the resistance 303 whereby the comparator 305 is inversed so as to bring the transistor 307 in the switched on state in such a manner that the limit alarm lamp 309 in the indication part of $\frac{1}{4}$ sec. lights up. Hereby 312 to 315 compose the circuits for operation the above mentioned limit alarm lamp in case of the flash light photography with the charge completion signal. In case the shutter time is between 1/60 sec. and $\frac{1}{4}$ sec., the shutter time is not limited whereby the above mentioned limit alarm lamp does not light up.

Figure 12E:
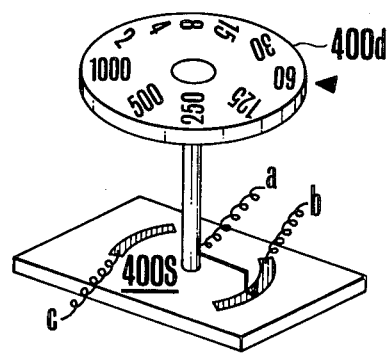
FIG. 12(e) shows the then composition in perspective view.
Figure 12F:
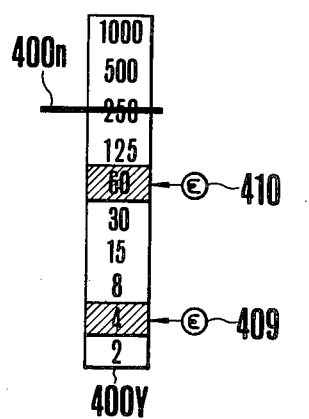
FIG. 12(f) shows the then mode of indication.
Figure 12D:
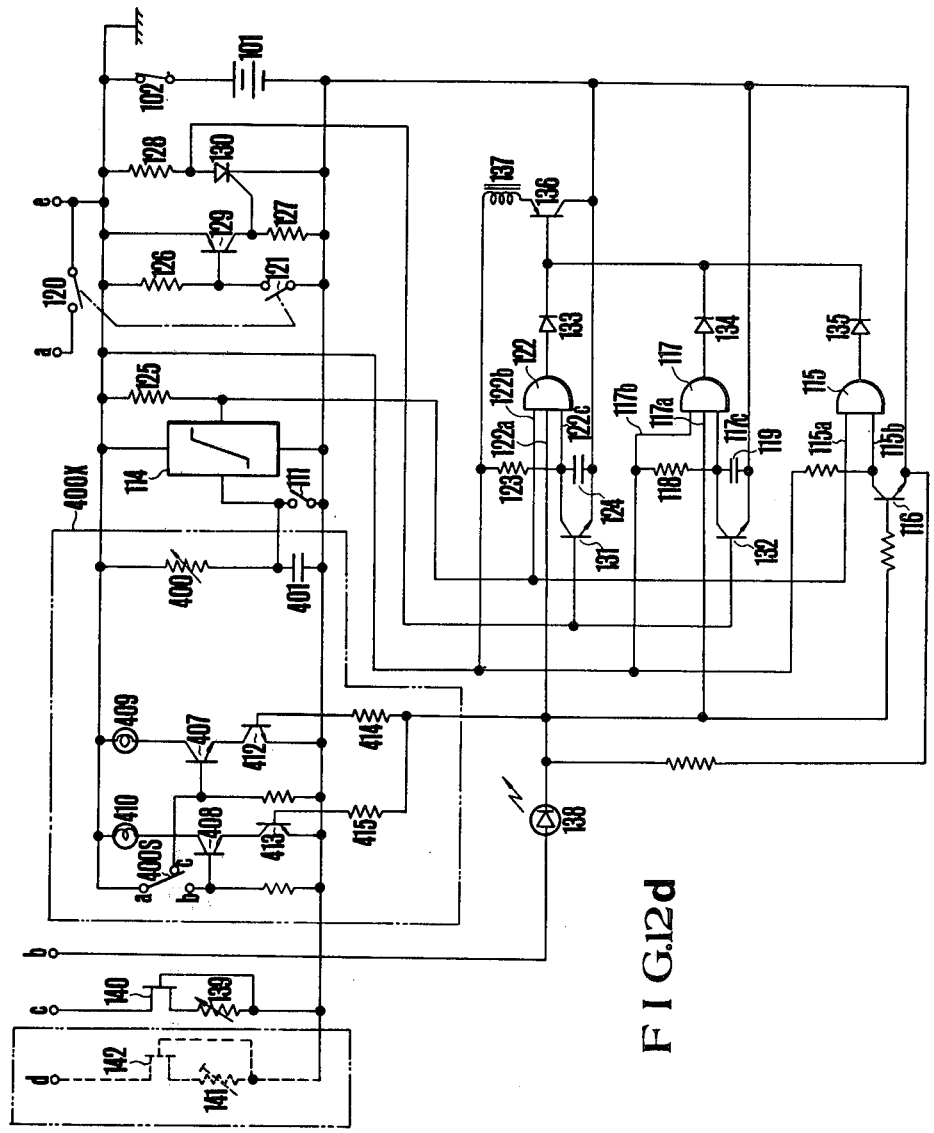
FIG. 12(d) shows a circuit diagram of an application.

FIG. 12(d), (e) and (f) show the application of the alarm indication shown in FIG. 12(b). Namely the circuit 400X is provided in such a manner that the shutter time limit is indicated at the time of taking a photograph under the flash light in case of the auto-exposure with priority on shutter time. In this case 400S is the switch in functional engagement with the shutter time setting dial 400d as is shown in FIG. 12(e), whereby in case the shutter time is set shorter than 1/60 sec. the contacts a and b are connected to each other, while in case the shutter time is set longer than 1/4 sec. the contacts a and c are connected to each other. 400 is the variable resistance in functional engagement with the shutter time setting dial for producing an analog-signal, 301 the integrating condenser. FIG. 12(f) shows the then indication state, whereby 400Y is the shutter time indication part. 409 and 410 are the limit alarm lamps for indicating that the shutter time is in the limit state. 400n is the indication finger in functional engagement with the shutter setting dial for indicating the set shutter time.

The operation of the composition shown in FIG. 12(d) (e) is as follows. In case a photograph is tried to be taken under the flash light while the shutter is set at a shorter time than 1/60 sec., the contacts a and b of the switch 400S are connected to each other in such a manner that the charge completion signal from the flash light device is put in the transistor 413 so as to bring the transistors 408 and 413 in the switched-on state whereby the limit alarm lamp 410 lights up, showing that the shutter time is limited at 1/60 sec. When in this state the shutter is released a photograph is taken under the flash light with the limited shutter speed of 1/60 sec. In case the shutter time is set between 1/60 sec. and $\frac{1}{4}$ sec. the switch 400S is not connected either to the contact b or to the contact c so that the circuit 400X does not operate and the limit alarm lamp does not light up whereby a photograph is taken under the flash light with the set shutter time as explained above. When a photograph is tried to be taken under the flash light while the shutter is set at a longer time than $\frac{1}{4}$ sec., the contact a of the switch 400S is connected to the contact c and the charge completion signal from the flash light device is put in the transistor 412 so as to bring the transistors 407 and 412 in the switched on state whereby the limit alarm lamp 409 lights up, showing that the shutter time is limited at $\frac{1}{4}$ sec. When then the shutter is released, a photograph is taken under the flash light with the limited shutter time of 1/4 sec. in a similar way as in the above mentioned case. Thus even when the auto-exposure with priority on the shutter time is carried out, according to the present system the shutter time is automatically controlled into the proper one at the time of taking a photograph under flash light.

Below an embodiment of the camera CD corresponding to the circuit diagram shown in FIG. 5 will be explained in accordance with the circuits diagrams shown in FIG. 7 and FIGS. 13 to 16. In case of the camera CD, both the day-light photography and the flash light photography are possible in the one changed over mode in the same way as in case of the above mentioned camera CT as explained in accordance with FIG. 5 and in the other changed over mode in the same way as in case of the above mentioned camera CA. Thus the present embodiment corresponds to the camera CT shown in FIGS. 7 to 11 whose circuit is provided with the change over setting means and further a mechanism presenting the function of the camera CA shown in FIG. 12. The circuits shown in FIGS. 13 to 16 are all supplied with current from the same current supply circuit as shown in FIG. 7, composing the first to the fourth circuit (circuit I to circuit IV), respectively corresponding to those shown in FIGS. 8 to 11, whereby the same components present the same numerical Figures. Below their compositions as well as their operations will be explained in accordance with the drawing.

Figure 13:
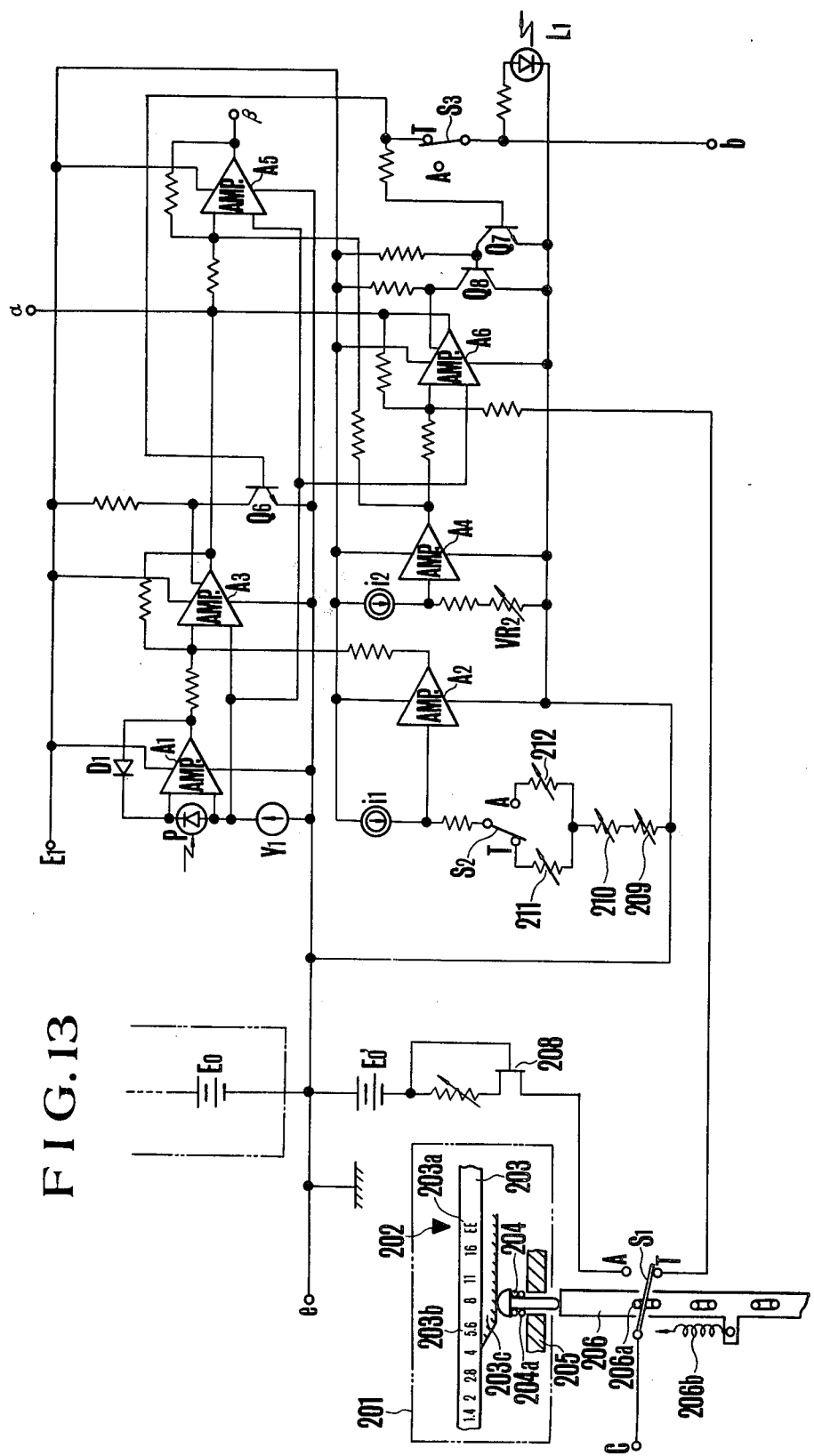
FIGS. 13 to 16 respectively show a circuit diagram of an embodiment of the first, the second, the third and the fourth circuit part of the camera in accordance with the present invention shown in FIG. 5.

FIG. 13 shows the first circuit for the light measurement and the operation in case of the day-light photography, for the charge completion indication and the operation in accordance with the input information from the flash light device or for the supply of the information to the flash light device in case of the flash light photography, whereby only when the charge completion signal is put in the circuit from the flash light device the circuit is automatically changed over into the flash light photographic mode.

E'o in FIG. 13 is the second current source connected in series with the current source Eo in FIG. 7 by means of the terminal as is shown in the drawing. $S_1$ to $S_3$ are the switches which, in accordance with the set state of the change over setting means of the camera, are changed over to the side of T together with the switches $S_4$ to $S_8$ shown in FIG. 14 to FIG. 16 to be explained later in case of the priority on shutter speed and to the side of A in case of the priority on aperture. An embodiment of the change over setting means will be explained in accordance with the drawing. 201 is the interchangeable lens presenting the diaphragm blades and so on capable of the automatic aperture setting, whereby the lens is provided with the fixed index 202, the aperture ring 203, the movable pin 204 movably adapted to the fixed member 205 and so on. When the EE mark 203a of the aperture ring 203 is set to the fixed index 202 as is shown in the drawing, the movable pin 204 is pushed out against the strength of the spring 204 by means of the cam face 203c. In this way the change over movable plate 206 at the side of the camera body is pushed downwards in the drawing against the strength of the spring 206b in such a manner that the change over switch $S_1$ is set at the side T by means of the provided insulation pin 206a. When the aperture scale 203b on the aperture ring 203 is set at the fixed index the cam face 203c is moved to the right in such a manner that the pin 204 as well as the movable plate 206 return upwards so as to change the switch $S_1$ over to the side A.

In case as mentioned above the interchangeable lens is set at EE in such a manner that the aperture of the lens is adjusted by means of the aperture control device at the side of the camera body, the switch $S_1$ is connected to the side of T, while the interchangeable lens is set at the aperture scale in such a manner that a photograph is taken with the aperture value desired by the photographer the switch $S_1$ is connected to the side A. In case all the above mentioned switches $S_2$ to $S_8$ are functionally engaged with the movable plate 206, it is possible for the photographer to change over the operation mode of the camera by only setting the aperture ring, without operating the shutter time setting dial. Further it is possible that all the switches $S_1$ to $S_8$ are not functionally engaged with the aperture ring but a part of them are functionally engaged with the shutter time setting dial (a setting position "AUTO" is provided on the shutter time setting dial in a conventional way), while it is also possible that all or a part of the switches $S_1$ to $S_8$ can be changed over by means of a change over operation member newly provided.

In the drawing 207 and 208 are respectively the variable resistance and the FET corresponding to 139 and 140 in FIG. 12, being intended to supply a current corresponding to the aperture information from the terminal e' of the flash light device to the terminal c' from the current source E'o in case the switch $S_1$ is at the side of A.

209 and 212 are the variable resistances respectively for producing the informations of the film speed, the vignetting compensation necessary for the bright lens, the shutter time set by means of the shutter time setting dial and the number of the steps by which the aperture is adjusted from the preset totally opened aperture value F. Thus in case the switch $S_2$ is at the side of T as is shown in the drawing, the same information as in case of $VR_1$ shown in FIG. 8 is put in the operation circuit by means of the above mentioned resistances 209, 210 and 211, while in case the switch $S_2$ is at the side of A the same information as in case of 107 shown in FIG. 12 is put in the operation circuit by means of 209, 210 and 211.

Below the operation of the circuit shown in FIG. 13 will be explained. At first the case that the switches $S_1$ to $S_3$ are set at the side of T as mentioned above will be explained. In this case, as is clear from the drawing Eo, 207, 208 and 212 is disconnected from the circuit and therefore the circuit operates as the same circuit as shown in FIG. 8. Namely in case no flash light device is mounted or even if a flash light device is mounted, the charge has not yet been completed, the diaphragm step number signal and the absolute value signal operated in accordance to the object brightness and the time set on the shutter time setting dial so as to obtain the proper exposure are produced respectively at the terminal $\alpha$ and $\beta$, whereby the aperture control and the indicator-alarm are carried out by means of a circuit to be explained later. Namely the autoexposure photography with priority on the shutter time is carried out under the day-light, whereby the proper exposure is automatically obtained. Further in case the flash light device is mounted and the charge has been completed, the operation mode of the circuit is changed over while the indication lamp L lights up by means of the charge completion signal put in the terminal b in such a manner that in accordance with the aperture information signal put in the terminal c from the flash light device the diaphragm step number signal and the absolute value signal are produced at the terminals $\alpha$ and $\beta$. Thus the aperture control as well as the indication-alarm are carried out and the proper exposure is obtained under the flash light device.

Below the case that the switches $S_1$ to $S_3$ are connected to the side of A will be explained. In this case, the switch $S_3$ is opened, so that the operation amplifiers $A_3$ as well as the $A_6$ are kept in the mode for the day-light photography no matter whether the charge completion signal exists or not. Further the switch $S_2$ is connected to the side of A so that at the terminal $\alpha$ a certain determined shutter time signal operated and from the object brightness, the present aperture value and so on is produced and stored in the circuit in FIG. 15 to be explained later so as to operate the shutter control circuit shown in FIG. 14. Hereby at the terminal $\beta$ a signal different from the output at the terminal $\alpha$ is produced and delivered to the aperture indication-alarm circuit shown in FIG. 16, whereby there takes place no inconvenience because the circuit in FIG. 16 is out of the operation state. Further a voltage is applied between the terminal e' and c' at the side of the flash light device through the switch $S_1$ so as to produce a current in accordance with the set conditions at the side of the camera.

In consequence the auto-exposure photography is carried out with priority on aperture in case of the day-light photography without using the flash light device, while in case of the flash light photography the shutter time signal in accordance with the object brightness is produced in the same way as in case of the day-light photography, whereby at the same time with the charge completion signal the above mentioned flash light device CD is automatically changed over into the operation mode as CA in such a manner that the flash light amount of the flash light device is controlled in accordance with the information from the side of the camera.

Figure 14:
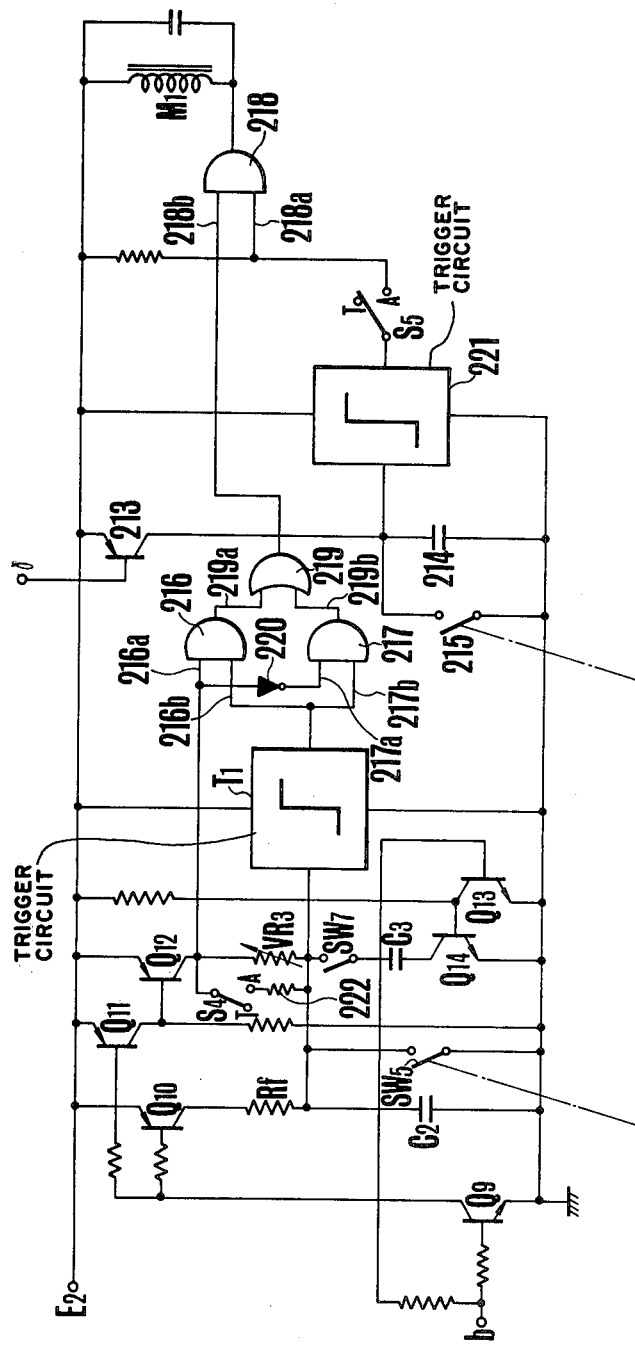

FIG. 14 shows the second circuit which controls the shutter mechanism in accordance with the time set on the shutter time setting dial or the operation result of the object brightness as well as the preset aperture value in case of the day-light photography while the circuit is automatically changed over so as to control the shutter mechanism with the time proper for the flash light photography in case of the flash light photography. As the shutter time in the present embodiment in case of the flash light photography, in case the camera is set up so as to operate with priority on shutter speed (the first flash light photography) the shutter mechanism is controlled with constant speed in the same way as in case of the embodiment shown in FIG. 9, while in case the camera is set so as to operate with priority on aperture (the second flash light photography) the shutter mechanism is controlled with a time in accordance with the object brightness and so on within the range in which the control means does not operate, in the same way as in case of the embodiment shown in FIG. 12.

FIG. 14 shows a circuit shown in FIG. 9, being additionally provided with the change over switch $S_4$ and $S_5$, the transister 213 and the condenser 214 corresponding to 112 and 113 shown in FIG. 12, the count starting switch 215 opening and closing synchronizing with the switch $SW_5$ for prolonging the actual time, the AND circuits 216 and 218, the OR circuit 219, the inverter 220, the trigger circuit 211, the fine resistance 222 and so on. Below the operation of the circuit will be explained. In case the camera is set so as to operate with the priority on the shutter speed, the switch $S_5$ is opened as is shown in the drawing so that the input terminal 218a of the AND circuit 218 assumes the potential of the current source $E_2$, quite independent of the input from the terminal $\gamma$. Thus as soon as the signal from the "OR" circuit 219 is put in the other input terminal 218b, the magnet $M_1$ operates so as to start the rear shutter plane. On the other hand, the switch $S_4$ is also opened so that the trigger circuit $T_1$ produces the same output as in case of the embodiment shown in FIG. 9. No charge completion signal is put in the terminal be in case of the day-light photography so that the transister $Q_{12}$ is in the switched on state, whereby by means of the current source the potential at the input terminal 216a of the AND circuit is raised up. On the other hand, the input terminal 217a of the "AND" circuit 217 is connected through the inverter 220 so that the circuit 217 produces no output in the present case. When the front shutter plane starts to run by the operation of the release and the switch $SW_5$ is at the same time opened, the trigger circuit $T_1$ produces an output after the elapse of the time determined by the variable resistances adjusted in accordance with the value set at the shutter dial and the condenser $c_2$ (or $c_2$ and $c_3$). Thus the voltage at the other input terminal 216b of the "AND" circuit goes up so that the circuit 216 operates whereby a signal is put in the input terminal 218b of the "AND" circuit through the "OR" circuit 219. Thus the "AND" circuit 218 operates so as to actuate the magnet $M_1$ in such a manner that the desired shutter time set at the shutter dial is obtained.

On the other hand in case the charge completion signal is put in from the flash light device, namely in case of the flash light photography the transistor $Q_{10}$ is in the switched on state while the transistor $Q_{12}$ is in the switched off state. Thus the trigger circuit $T_1$ produces an output after the elapse of the time for example 1/60 sec. determined by the resistance Rf. Thus the trigger circuit $T_1$ produces an output after the elapse of the time for example 1/60 sec. determined by the resistance Rf. In this way, the voltages at the terminals 216b and 217b of the "AND" circuits 216 and 217 are raised or when the transistor $Q_{12}$ has already been brought in the switched off state, the input terminal 217a of the "AND" circuit 217 is at the highest potential, the circuit 217 produces an output while the input terminal 218b of the "AND" circuit is also at the highest potential through the "OR" circuit 219 in such a manner that the magnet $M_1$ operates so as to obtain 1/60 sec. for the flash light photography.

As explained above, the circuit shown in FIG. 14 operates the shutter in accordance with the set position of the shutter time setting dial in case of the day-light photography with priority on shutter speed and with shutter time of 1/60 sec. independent of the set position in case of the flash light photography.

Below the case that the camera is set with priority an aperture will be explained. In this case the switch $S_5$ is at the side of A so that the shutter time is decided in accordance with the object brightness. The shutter time signal from the terminal $\alpha$ in FIG. 13 in accordance with the object brightness is once stored in the circuit shown in FIG. 15 to be explained later and then put in the terminal $\gamma$. Thus the stored compressed time information is enlarged into the actual time by the transistor 213 and the condenser 214, converted by means of the trigger circuit 221 into the pulse signal and put in the input terminal 218a of the "AND" circuit. In this way the highest potential is applied to the input terminal 218a of the "AND" circuit 218 at the time determined in accordance with the object brightness. On the other hand, a high potential is applied to the input terminal 218b at the time point different from that in case of the photography with priority on the shutter time as explained later. In case of the day-light photography the transistor $Q_{10}$ is in the switched off state while the transistor $Q_{12}$ is in the switched on state as explained above. In consequence only the input terminal 216a of the "AND" circuit is at a high potential at the same time when the voltage is applied from the current source $E_2$. Further the switch $S_4$ is at the side of A, an output is produced at the output terminal of the trigger circuit $T_1$ immediately after the elapse a very short time (for example 1/1000 sec.) determined by the fine resistance 222 after the start of the front shutter plane. Thus the "AND" circuit 216 produces an output immediately after the start of the front shutter plane, bringing the input terminal 218b of the "AND" circuit 218 at a high potential through the "AND" circuit. In this way, the shutter operates with the time determined in accordance with the object brightness and so on in case of the day-light photography.

On the other hand, in case of the flash light photography the transistor $Q_{10}$ is in the switched on state while the transistor $Q_{12}$ is in the switched off state as mentioned above by means of the charge completion signal put in the terminal b. In consequence the input terminal 217a of the "AND" circuit 217 is brought at a high potential at the same time when a voltage is applied from the current source $E_2$. Further the trigger circuit $T_1$ produces an output after the elapse of the time for example 1/60 sec. determined by the resistance Rf, whereby the other input terminal 217b of the "AND" circuit 217 is also brought at a high potential. Thus the circuit 217 produces an output, bringing the input terminal 218b of the "AND" circuit 218 at a high potential through the "OR" circuit. As explained above in case of the flash light photography an input is put in the input terminal 218a of the "AND" circuit 218 at the time point in accordance with the object brightness while an input is put in the input terminal 218b at the time point corresponding to 1/60 sec. Thus the shutter operates with 1/60 sec. in case the object is bright, while the shutter operates with the time in accordance with the object brightness in case the object is darker so as to obtain the proper exposure for the flash light photography.

The shutter control circuit shown in FIG. 14, operates the shutter with the time set at the shutter time setting dial in case of the day-light photography with priority on shutter speed and with 1/60 sec. in case of the flash light photography with priority on shutter time. Further the circuit operates the shutter with the time in accordance with the object brightness and so on in case of the day-light photography with priority on aperture and with the time longer than 1/60 sec. and in accordance with the object brightness in case of the flash light photography with priority on aperture.

Figure 15:
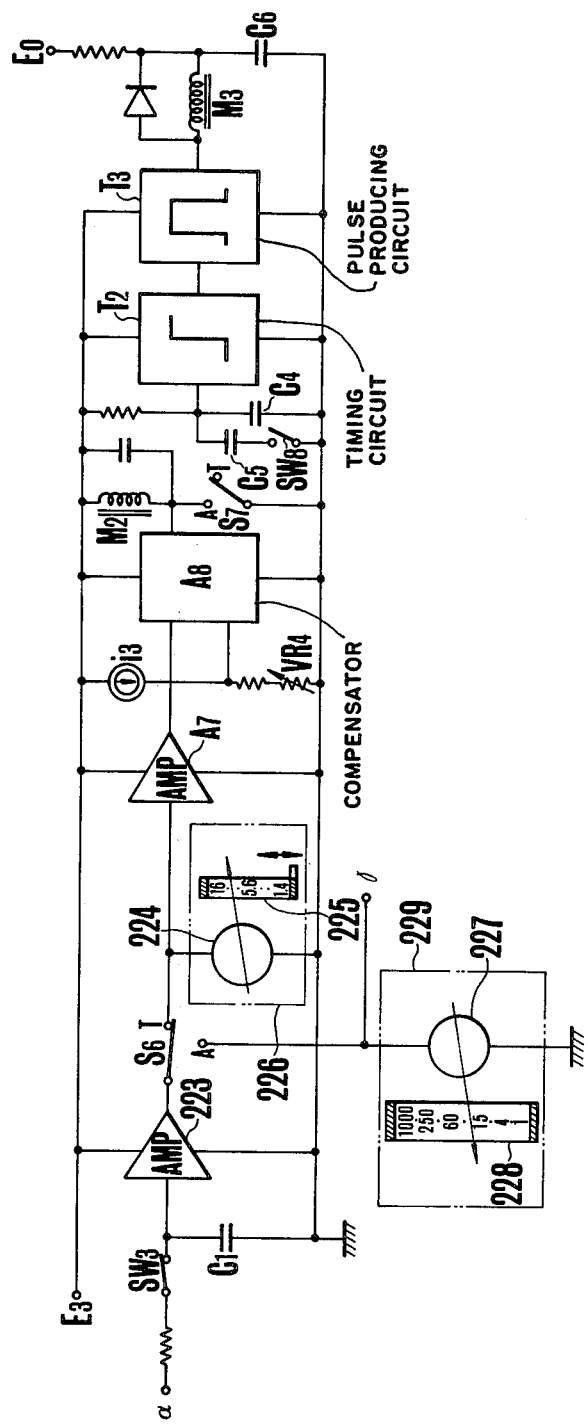
Figure 16:
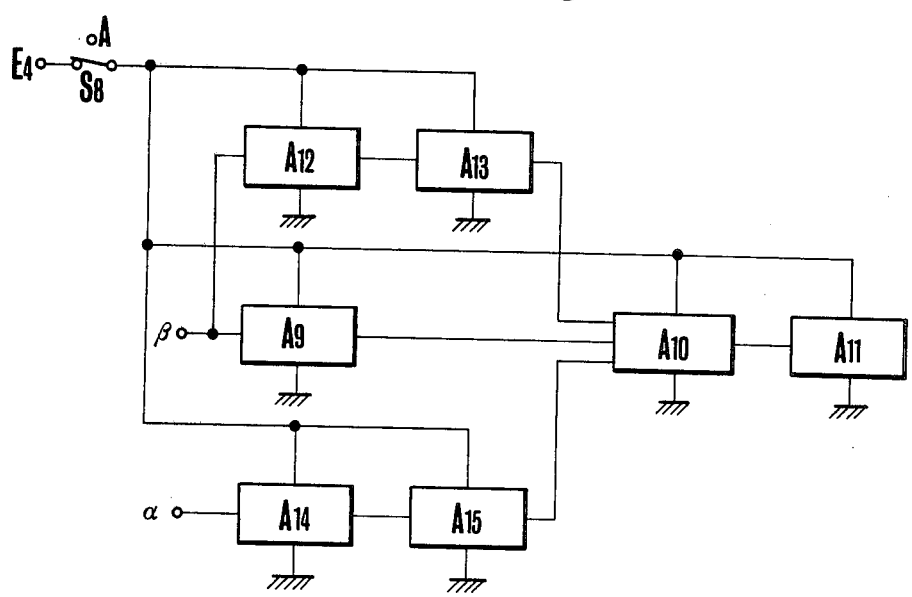

FIG. 15 shows the third circuit consisting of a circuit for adjusting the diaphragm of the photographic lens up to the determined aperture value in accordance with the input from the first circuit (FIG. 13) in case of the day-light photography as well as the flash light photography, a shutter time indication circuit, an aperture indication circuit, a holding circuit for controlling the starting of the mirror rising and an electronic self timer circuit.

The present embodiment corresponds to the circuit shown in FIG. 10 which is additionally provided with the change over switch $S_6$ and $S_7$, the buffer 223, the aperture indication device 226 consisting of an ampere meter 224 and the aperture scale plate 226 to be displaced in accordance with the totally opened F value of the mounted lens and the shutter time indication device 229 consisting of an ampere meter 227 and the shutter time scale plate 228. The diaphragm step number signal in accordance with the object brightness or the output of the flash light device is put in the terminal $\alpha$ from the circuit shown in FIG. 13 in case of the photography with priority on the shutter time (the switch at the side of T) while the shutter time signal in accordance with the object brightness is put in the terminal $\alpha$ no matter whether it is the day-light photography or the flash light photography. This signal is once stored in the condenser and at the same time operates the aperture indication device 226 or in the shutter time indication device 229. Further the magnet $M_2$ is operated so as to control the aperture or the shutter control circuit shown in FIG. 14 through the terminal $\gamma$ after the memory switch $SW_3$ is opened by the release operation. The electronic shutter circuit is same as that shown in FIG. 10 and therefore the explanation is omitted here. Further the diaphragm control system in case of the photography with priority on shutter time, corresponds to that shown in FIG. 10 which is additionally provided with buffer 223 so that the explanation is omitted. The aperture indication device 226 operating in case of the photography with priority on shutter time can be omitted in case that shown in FIG. 16 is provided so that it is sufficient to provide either one. The reason why the aperture scale plate 225 is displaced in accordance with the totally opened F value of the aperture scale plate 225 is that the position of the indication finger of the ampere meter 224 corresponds to the diaphragm step number value. The reason why the switch $S_7$ closing in case of the photography with priority on the aperture is that according to the composition of the diaphragm control mechanism controlled by the magnet $M_2$ it becomes impossible to adjust the diaphragm up to the preset aperture value automatically unless the magnet $M_2$ is kept in the excited state in case of the photography with priority on aperture (in case the diaphragm of the lens is manually preset). It goes without saying that it is possible to omit the switch $S_7$ depending upon the composition of the diaphragm control mechanism.

FIG. 16 shows an embodiment of the aperture indication device which can be omitted in case the embodiment shown in FIG. 15 is provided with the aperture indication device 226. This corresponds to that shown in FIG. 11, which is additionally provided with the change over switch $S_8$. In case the camera is used with priority on the aperture the indication of the aperture is not necessary and further there is a possibility of misoperation, so that the above mentioned switch $S_8$ is provided partly for the sake of economy of the power.

As explained above the camera CD in accordance with the camera shown in FIGS. 13 to 16 and being supplied with the current from the current supply circuit shown in FIG. 7 is capable of not only the auto-exposure photography with priority on the shutter time under the day-light but also the auto-exposure photography with priority on the aperture, whereby the first flash light photography with the flash light device ST, the second flash light photography with the flash light device SA and the first and second flash light photography are all possible. The camera CD can be said to be the one with remarkably wide field of application.

In case of the system with the flash light device presenting the information input and output terminals so far explained in detail in accordance with the present information the aperture information for adjusting the diaphragm is delivered to the side of camera from the output terminal producing the aperture information so as to enable the indication of the aperture value or the control of the diaphragm at the side of the camera, while in case the system is connected to the camera producing the aperture information, it is possible to control the flash light amount in accordance with the aperture information put in from the side of the camera. Namely although the device is a single flash light device, it is possible to carry out the flash light photography in functional engagement with a two system camera simply by adding simple components, so that the flash light system is remarkably effective in the economy and utilization.

Further, the present invention has many features as follows. The aperture information input terminal and the aperture information output terminal are combined in a common terminal so as to decrease the number of the terminals. The operation modes can be automatically changed over in accordance with the system of the connected camera. The necessary information can be produced so as to automatically change the diaphragm control circuit and the shutter time control circuit at the side of the camera over into the flash light photographic mode and so on.

What is claimed is:
1. A flash unit usable with either a first camera having a terminal for receiving a diaphragm aperture control signal from the flash unit and/or a second camera, which controls the amount of light emitted by the flash unit by applying a signal corresponding to a preset diaphragm aperture value into flash unit, said unit comprising:
  (a) flash means for generating a flash of light,
  (b) diaphragm aperture control signal forming circuit to form a diaphragm aperture control signal corresponding to a diaphragm aperture value suitable for flash photography,
  (c) a light emission control circuit coupled to said flash means for controlling the amount of light emitted by said flash means,
  (d) a diaphragm aperture information input means coupled to said light emission control circuit for inputting a signal corresponding to the diaphragm aperture value preset into the second camera to set a diaphragm aperture value information into said light emission control circuit,
  (e) a signal transmission circuit for outputting the diaphragm aperture control signal from the flash unit and for inputting said signal corresponding to a preset diaphragm aperture value selectively, said signal transmission circuit including switching means for alternately selecting said diaphragm aperture control signal forming circuit or said diaphragm aperture information input means so that when diaphragm aperture control signal forming circuit is selected by the switching means, a signal corresponding to a diaphragm aperture value is outputted from the signal transmission circuit to the first camera so as to allow a flash photography with the first camera and when the diaphragm aperture information input means is selected by switching means, a preset diaphragm aperture value information is set to the light emission control circuit so as to allow a flash photography with the second camera.

2. A flash unit according to claim 1, further comprising accumulation means connected to the flash means to accumulate the energy for generating light by said flash means, and a detection circuit coupled to said accumulation means to detect the energy level accumulated at said accumulation means and for generating an output when said energy reaches a prescribed level, a light emission control circuit and/or control signal forming circuit being coupled to and activated in response to the output of said detection circuit.

3. A flash unit according to claim 1, wherein said switching means is responsive to the signal corresponding to said preset diaphragm aperture for selecting the diaphragm information input means.

4. A flash unit according to claim 2, in which said first camera includes a first shutter time forming circuit for forming a shutter time corresponding to a preset shutter time, a second shutter time forming circuit for forming a shutter time for flash photography, a selecting circuit connected to said first and second shutter time forming circuits for selecting the second shutter time forming circuit in response to said output from said detection circuit, whereby the shutter time is controlled by the second shutter time forming circuit at the time of flash photography.

5. A flash unit according to claim 1, in which said first camera includes a shutter dial and shutter time control circuit for controlling the shutter time corresponding to the setting time by the shutter dial, said shutter time control circuit including shutter time regulating circuit for regulating the shutter time suitable for flash photography when the shutter time set by said shutter dial is not suited for flash photography.

6. A flash unit according to claim 5, in which said first camera includes indication circuit for detecting the shutter time set by said shutter dial to indicate that the shutter time is regulated by said shutter time regulating circuit when the shutter time set by shutter dial is not suitable for flash photography.

7. A flash unit according to claim 1, in which said second camera includes a light measuring circuit for producing an output corresponding to the intensity of light to be photographed and shutter time control circuit for controlling the shutter time based on the output of said light measuring circuit, said shutter time control circuit including shutter time regulating circuit for regulating the shutter time suitable for flash photography when the shutter time corresponding to the output of said light measuring circuit is not suitable for flash light photography.

8. A flash unit according to claim 7, in which said second camera including indication circuit for indicating the operation of said shutter time regulating circuit.

9. A flash unit according to claim 8, in which said indication circuit includes a detection means for detecting the output of said light measuring circuit and said indication circuit indicate that the shutter time is regulated by said shutter time regulating circuit in response to the output of said detection means when shutter time corresponding to the output of said light measuring circuit is not suitable for flash photography.

10. A flash unit according to claim 7, in which said second camera includes a diaphragm aperture presetting means for setting the diaphragm aperture value to applying said signal corresponding to a preset diaphragm aperture value into the flash unit.

11. A flash light device for use with either the first camera containing a diaphragm aperture control circuit to control a diaphragm aperture on the basis of the electric signal produced at an output terminal of the flash light device, or a second camera containing diaphragm aperture information output means for producing an electric signal whose level corresponding to a preset diaphragm aperture value for controlling the amount of light emitted by the flash light device by applying the electric signal into the flash light device, wherein said flash light device comprises:
  (a) a flash discharge tube,
  (b) a light emission control circuit coupled to the tube to control the amount of flash light emitted by said flash discharge tube,
  (c) power source,
  (d) a current forming circuit connected to said power source for producing a certain constant current, said circuit including an adjusting means to adjust the current produced by said circuit to correspond to a diaphragm aperture value suitable for flash photography,
  (e) information preset means coupled to said adjusting means and said light emission control circuit for setting information corresponding to the preset diaphragm aperture value into said light emission control circuit in response to the electric signal from second camera,
  (f) an external terminal for inputting electric signal from second camera and for outputting the current from the current forming circuit, (g) a connection circuit including a connection to connect said terminal selectively with either current forming circuit or with said information preset means, and said connection circuit control the connecting means to connect the terminal with the information preset means in response to the electric signal from second camera.

12. A camera, usable with a flash device for flash photography comprising:
 (a) a light measuring circuit for producing an output corresponding to the intensity of light to be photographed,
 (b) a shutter time control circuit for controlling the shutter time on basis of the output of said light measuring circuit, said shutter time control circuit including shutter time regulating circuit for regulating the shutter time suitable for flash photography when the shutter time corresponding to the output of said light measuring circuit is not suitable for flash photography,
 (c) an indication circuit for detecting the output of said light measuring circuit to indicate that the shutter time is regulated by said shutter time regulating circuit, when the shutter time corresponding to the output of said light measuring circuit is not suitable for flash photography.

13. A camera according to claim 12, in which said shutter time regulating circuit including a first shutter time forming circuit for forming a certain shutter time for flash photography and a first control circuit for controlling the shutter time based on the shutter time formed by said first shutter time forming circuit when said shutter time corresponding to the output of light measuring circuit is shorter than the shutter time formed by said first shutter time forming circuit; and said indication circuit includes a first shutter time information producing means for producing an output corresponding to the shutter time formed by said first shutter time forming circuit, a comparison circuit for comparing the output of light measuring circuit and output of first shutter time information producing means to produce an output signal when the shutter time corresponding to the output of light measuring circuit is shorter than the shutter time corresponding to the output of first shutter time information producing means; and first indication means operated in response to the output signal from comparison circuit for indicating that the shutter time is controlled by the first control circuit.

14. A camera according to claim 13, in which said shutter time regulating circuit includes a second shutter time forming circuit for forming a longer shutter time than the shutter time formed by said first shutter time forming circuit and second control circuit for controlling the shutter time based on the shutter time formed by said second shutter time forming circuit when said shutter time corresponding to the output of light measuring circuit is longer than the shutter time formed by said second shutter time forming circuit; said indication circuit including a second shutter time information producing means for producing an output corresponding to the shutter time formed by said second shutter time forming circuit, a comparison circuit for comparing the output of light measuring circuit and output of second shutter time information producing means to produce an output signal when the shutter time corresponding to the output of light measuring circuit is longer than the shutter time corresponding to the output of second shutter time information producing means, and second indication means operated in response to the output signal from comparison circuit, for indicating that the shutter time is controlled by the second control circuit.

15. A camera according to claim 12, in which said shutter time regulating circuit includes a shutter time forming circuit for forming a certain shutter time for flash photography and a control circuit for controlling the shutter time based on the shutter time formed by said shutter time forming circuit when said shutter time corresponding to the output of light measuring circuit is longer than the shutter time formed by said shutter time forming circuit; said indication circuit including shutter time information producing means for producing an output corresponding to the shutter time formed by said shutter time forming circuit, a comparison circuit for comparing the output of light measuring circuit, and output of shutter time information producing means to produce an output signal when the shutter time corresponding to the output of light measuring circuit is longer than the shutter time corresponding to the output of shutter time information producing means, and indication means operated in response to the output signal from comparison circuit for indicating that the shutter time is controlled by the control circuit.

16. A camera, usable with a flash device for a flash device, which comprises:
 (a) a shutter dial for setting a shutter time,
 (b) shutter time control circuit for controlling the shutter time on the basis of a shutter time preset by said dial, said shutter time control circuit including a first time forming means for forming a shutter time corresponding to the preset shutter time and second time forming means for forming a shutter time corresponding to a shutter time suitable for flash photography and regulating circuit for regulating the shutter time on the basis of shutter time formed by second time forming means which said shutter time formed by said first time forming means is not suitable for flash photography,
 (c) detecting means for detecting the shutter time value set by said dial;
 (d) an indicating circuit for indicating the shutter time is regulated by said regulating circuit; and
 (e) actuating means for actuating said indication circuit when the shutter time value detected by detecting means is not suitable for flash photography.

17. A camera according to claim 16, in which said shutter time regulating circuit is arranged for regulating the shutter time on the basis of the shutter time formed by said second time forming means when said shutter time formed by said first time forming means is shorter than the shutter time formed by said second time forming means, and said detecting means includes switch means coupled to said shutter dial.

18. A camera according to claim 16, in which said shutter time regulating circuit is arranged to regulate the shutter time on the basis of shutter time formed by said second time forming means when said shutter time formed by said first time forming means is shorter than the shutter time formed by said second time forming means; and said detecting means includes switch means coupled to said dial.

19. A camera according to claim 16, in which said detecting means includes switch means coupled to said shutter dial for actuating said actuating means when the shutter time set by said shutter dial is not suitable for flash photography.

20. A camera usable wish a flash light device for flash photography comprising:
  (a) a light measuring circuit for producing an output corresponding to the intensity of light to be photographed,
  (b) diaphragm aperture presetting means for setting a diaphragm aperture value,
  (c) a shutter time control circuit for controlling the shutter time based on the output of said light measuring circuit and diaphragm aperture value,
  (d) a shutter regulating circuit for regulating the shutter time suitable for flash photography, said regulating circuit regulates the shutter time when said shutter time controlled by said control circuit is not suitable for flash photography; and
  (e) aperture information forming means for forming a signal corresponding to the preset diaphragm aperture value to control an amount of light emitted by the flash light device based on the preset diaphragm aperture value.

21. A flash device for controlling an amount of light emitted therefrom by applying a preset diaphragm aperture signal from a camera comprising:
  (a) flash means to generate a flash of light,
  (b) an external terminal for receiving a signal corresponding to a diaphragm aperture value present in the camera,
  (c) diaphragm aperture information forming means for forming a signal corresponding to a diaphragm aperture value,
  (d) light emission control means to control the amount of light emitted by the flash means on the basis of the signal corresponding to the diaphragm aperture value preset in the camera or the signal from the diaphragm aperture information forming means,
  (e) connecting means for selectively connecting said light emission control means with said external terminal or with said diaphragm aperture information forming means, said connecting means responsive to an electrical signal from a camera for connecting said light emission control means with said external terminal.

22. A camera according to claim 21, in which said flash device comprises a store means for storing the flash energy, and a signal forming means for outputting a store-completion signal when the flash energy is stored in the store means to a predetermined amount, and said connecting means operates in response to the store-completion signal.

* * * * *